(12) United States Patent
Nakamura et al.

(10) Patent No.: US 11,117,581 B2
(45) Date of Patent: Sep. 14, 2021

(54) VEHICLE TRAVEL ASSIST DEVICE

(71) Applicant: TOYOTA JIDOSHA KABUSHIKI KAISHA, Toyota (JP)

(72) Inventors: Tomomichi Nakamura, Sunto-gun (JP); Yoshihiko Kosegaki, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 144 days.

(21) Appl. No.: 16/427,485

(22) Filed: May 31, 2019

(65) Prior Publication Data

US 2020/0031351 A1 Jan. 30, 2020

(30) Foreign Application Priority Data

Jul. 26, 2018 (JP) .............................. JP2018-140423

(51) Int. Cl.
| | |
|---|---|
| *B60W 30/18* | (2012.01) |
| *B60W 10/04* | (2006.01) |
| *B60W 10/18* | (2012.01) |
| *B60W 50/00* | (2006.01) |
| *B60W 30/06* | (2006.01) |

(52) U.S. Cl.
CPC ............ *B60W 30/18* (2013.01); *B60W 10/04* (2013.01); *B60W 10/18* (2013.01); *B60W 50/0097* (2013.01); *B60W 30/06* (2013.01); *B60W 2400/00* (2013.01); *B60W 2710/18* (2013.01); *B60W 2720/106* (2013.01)

(58) Field of Classification Search
CPC ...... B60W 30/06; B60W 30/18; B60W 10/04; B60W 10/18; B60W 50/0097; B60W 2720/106; B60W 2400/00; B60W 2710/18
See application file for complete search history.

(56) References Cited

U.S. PATENT DOCUMENTS

2012/0143456 A1\* 6/2012 Ueda ..................... B60W 40/06
701/93
2017/0349170 A1\* 12/2017 Sawada ........... B60W 30/18009

FOREIGN PATENT DOCUMENTS

| JP | 2013-049389 A | 3/2013 |
|---|---|---|
| JP | 2018-075899 A | 5/2018 |

\* cited by examiner

*Primary Examiner* — Anne Marie Antonucci
*Assistant Examiner* — Sahar Motazedi
(74) *Attorney, Agent, or Firm* — Sughrue Mion, PLLC

(57) ABSTRACT

A vehicle travel control device controls travel of a vehicle toward a target stop position. Travel state information indicates a travel state of the vehicle and includes vehicle position information indicating positions the vehicle and each wheel. Difference-in-level position information indicates a position of a difference-in-level on a travel path. The vehicle travel control device determines whether the vehicle goes beyond the target stop position when a subject wheel of the vehicle passes the difference-in-level, based on the difference-in-level position information and the vehicle position information. When determining that the vehicle goes beyond the target stop position, the vehicle travel control device changes the target stop position so as to prevent the subject wheel from passing the difference-in-level, or generates a braking force to stop the vehicle before the subject wheel passes the difference-in-level.

4 Claims, 20 Drawing Sheets

VEHICLE TRAVEL ASSIST DEVICE

BACKGROUND

Technical Field

The present disclosure relates to a vehicle travel assist device that assists vehicle travel. In particular, the present disclosure relates to a vehicle travel assist device that controls travel of a vehicle toward a target stop position.

Background Art

A technique that assists vehicle travel by automatically controlling the vehicle travel is known. Such the technique is exemplified by parking assist that automatically parks a vehicle at a target position.

Patent Literature 1 discloses a method that controls a braking force and a driving force of a vehicle to park the vehicle at a target position. When a wheel comes into contact with a difference-in-level and stops, the driving force is increased in order to climb over the difference-in-level. More specifically, the driving force is increased so as to compensate for decrease in a vehicle speed caused by the wheel coming into contact with the difference-in-level. Then, it is determined whether or not the wheel coming into contact with the difference-in-level leaves the ground. When it is determined that the wheel coming into contact with the difference-in-level leaves the ground, the driving force is gradually decreased.

List of Related Art

Patent Literature 1: Japanese Unexamined Patent Application Publication No. JP-2013-049389

SUMMARY

Depending on a relationship between a target stop position and a position of a difference-in-level, a vehicle may go beyond the target stop position when a certain wheel passes the difference-in-level. The above-mentioned Patent Literature 1 does not describe how to deal with such a situation.

An object of the present disclosure is to provide a technique that can prevent a vehicle from going beyond a target stop position due to a wheel passing a difference-in-level.

A first aspect provides a vehicle travel assist device installed on a vehicle.

The vehicle travel assist device includes:

a vehicle travel control device configured to control travel of the vehicle toward a target stop position;

a travel state acquisition device configured to acquire travel state information indicating a travel state of the vehicle; and a difference-in-level position estimation device configured to acquire difference-in-level position information indicating a position of a difference-in-level on a travel path of the vehicle.

The travel state information includes vehicle position information indicating a position the vehicle and a position of each wheel.

The vehicle travel control device is further configured to:

determine whether or not the vehicle goes beyond the target stop position when a subject wheel of the vehicle passes the difference-in-level, based on the difference-in-level position information and the vehicle position information; and when determining that the vehicle goes beyond the target stop position when the subject wheel passes the difference-in-level, change the target stop position so as to prevent the subject wheel from passing the difference-in-level, or generate a braking force to stop the vehicle before the subject wheel passes the difference-in-level.

A second aspect further has the following feature in addition to the first aspect.

The vehicle includes a first wheel and a second wheel that reaches the difference-in-level after the first wheel.

The subject wheel is the second wheel.

A third aspect further has the following feature in addition to the second aspect.

The first wheel includes two wheels.

The difference-in-level position estimation device is further configured to:

acquire respective positions of the two wheels when passing the difference-in-level as a first passing position and a second passing position, based on the vehicle position information; and assume a position of a line connecting the first passing position and the second passing position as the position of the difference-in-level.

A fourth aspect further has the following feature in addition to any one of the first to third aspects.

The vehicle travel control device is further configured to:

predict the position of the vehicle at a timing when the subject wheel passes the difference-in-level, as a predicted vehicle position, based on the difference-in-level position information and the vehicle position information; and when the predicted vehicle position goes beyond the target stop position or the predicted vehicle position is within a predetermined range before the target stop position, determine that the vehicle goes beyond the target stop position when the subject wheel passes the difference-in-level.

According to the present disclosure, it is possible to prevent the vehicle from going beyond the target stop position due to the wheel passing the difference-in-level.

EMBODIMENTS

Embodiments of the present disclosure will be described below with reference to the attached drawings.

1. Outline of Vehicle Travel Assist Device

Figure 1:
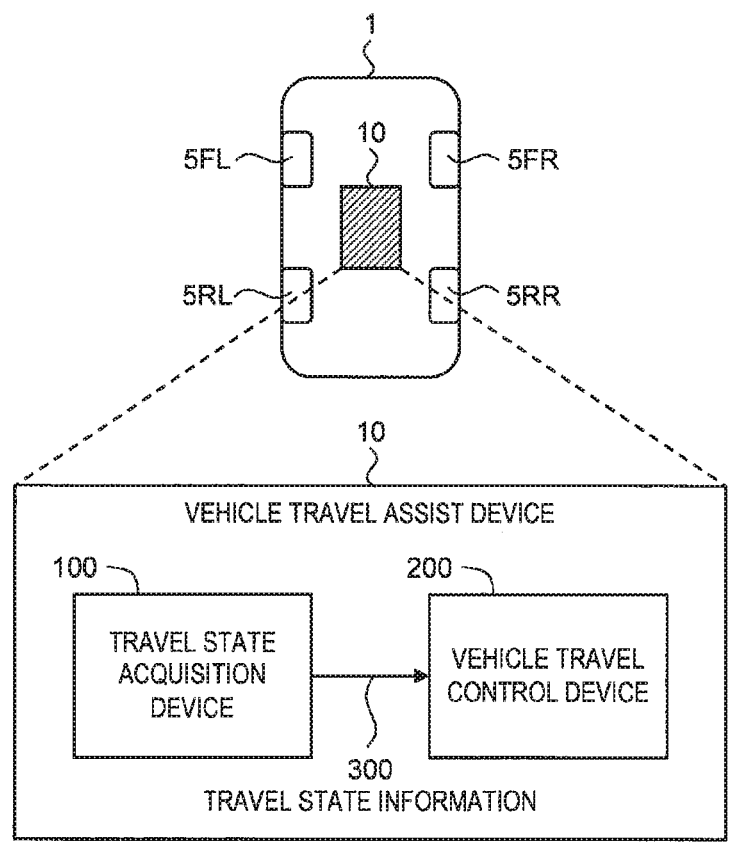
FIG. 1 is a conceptual diagram for explaining an outline of a vehicle travel assist device installed on a vehicle according to an embodiment of the present disclosure.

FIG. 1 is a conceptual diagram for explaining an outline of a vehicle travel assist device 10 installed on a vehicle 1 according to the present embodiment. The vehicle 1 is provided with a plurality of wheels 5. More specifically, the vehicle 1 is provided with a left front wheel 5FL, a right front wheel 5FR, a left rear wheel 5RL, and a right rear wheel 5RR. In the following description, the left front wheel 5FL and the right front wheel 5FR may be collectively referred to as a "front wheel", and the left rear wheel 5RL and the right rear wheel 5RR may be collectively referred to as a "rear wheel".

As shown in FIG. 1, the vehicle travel assist device 10 includes a travel state acquisition device 100 and a vehicle travel control device 200. The travel state acquisition device 100 acquires travel state information 300 indicating a travel state of the vehicle 1. The travel state of the vehicle 1 is exemplified by a position, a speed (a vehicle speed), an acceleration, a steering angle, a driving force, a braking force, a surrounding situation, and the like. The vehicle travel control device 200 executes "vehicle travel control" that controls travel of the vehicle 1, based on the travel state information 300. The vehicle travel control includes driving force control, braking force control, and steering control.

The vehicle travel assist device 10 assists (supports) the travel of the vehicle 1 through the vehicle travel control. For example, the vehicle travel assist device 10 executes vehicle guidance control that automatically moves the vehicle 1 and stops it at a target stop position. Such the vehicle guidance control is utilized, for example, when parking the vehicle 1 at a desired parking position. It should be noted that the vehicle travel control according to the present embodiment is not limited to the vehicle guidance control.

A difference-in-level may exist on a travel path of the vehicle 1 during the vehicle travel control. In this case, the vehicle travel control device 200 executes the vehicle travel control (especially, the driving force control) such that the wheel 5 appropriately passes the difference-in-level.

Here, "the wheel 5 passing the difference-in-level" means that the wheel 5 reaches (i.e. comes into contact with) the difference-in-level and further climbs over the difference-in-level. A "passing period" in which the wheel 5 passes the difference-in-level is a period from when the wheel 5 reaches (i.e. comes into contact with) the difference-in-level to when the wheel 5 climbs over the difference-in-level. Two wheels 5 may concurrently pass the difference-in-level. That is, a set of the left front wheel 5FL and the right front wheel 5FR or a set of the left rear wheel 5RL and the right rear wheel 5RR may concurrently pass the difference-in-level. "Two wheels 5 concurrently passing the difference-in-level" means that respective passing periods of the two wheels 5 at least partially overlap with each other.

It should be noted in the present embodiment that a shape of the difference-in-level is not limited in particular. For example, the shape of the difference-in-level includes a step shape, a slope shape, and a bump shape.

Figure 2:
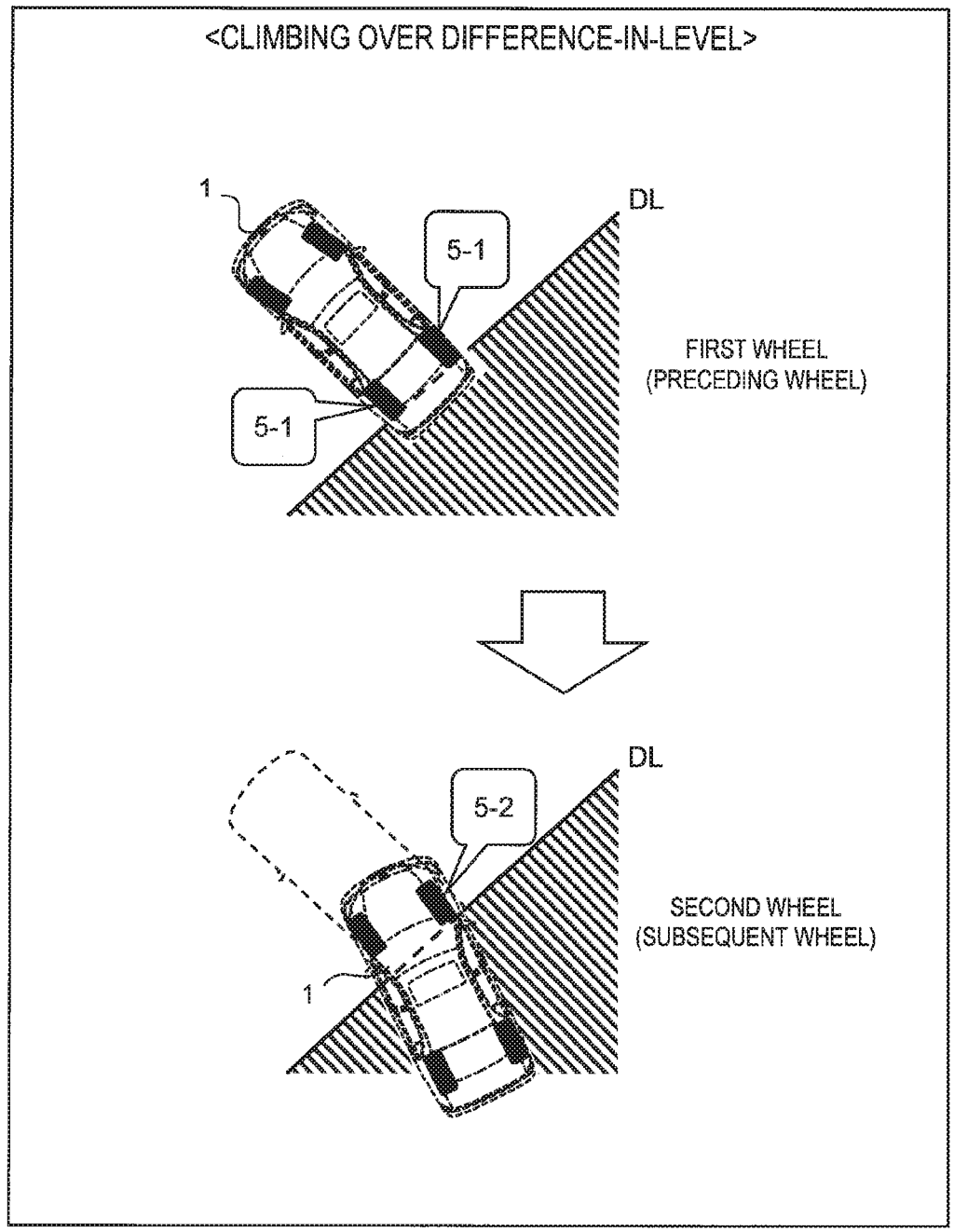
FIG. 2 is a conceptual diagram for explaining a situation where the vehicle climbs over a difference-in-level according to the embodiment of the present disclosure.

FIG. 2 is a conceptual diagram for explaining climbing over a difference-in-level DL. As the vehicle 1 moves, the plurality of wheels 5 reach the difference-in-level DL in series. A wheel 5 that reaches the difference-in-level DL relatively early (i.e. a preceding wheel) is hereinafter referred to as a "first wheel 5-1". A wheel 5 that reaches the difference-in-level DL relatively late (i.e. a subsequent wheel) is hereinafter referred to as a "second wheel 5-2".

As an example, let us consider a case where the right rear wheel 5RR and the left rear wheel 5RL concurrently pass the difference-in-level DL and thereafter the right front wheel 5FR and reaches the difference-in-level DL. In this case, the right rear wheel 5RR and the left rear wheel 5RL each is the first wheel 5-1, and the right front wheel 5FR is the second wheel 5-2.

As another example, let us consider a case where the right rear wheel 5RR, the left rear wheel 5RL, and the right front wheel 5FR pass the difference-in-level DL in this order. In this case, the right rear wheel 5RR is the first wheel 5-1, and the right front wheel 5FR is the second wheel 5-2. The left rear wheel 5RL is the second wheel 5-2 with respect to the right rear wheel 5RR (the first wheel 5-1), and is the first wheel 5-1 with respect to the right front wheel 5FR (the second wheel 5-2).

The first wheel 5-1 reaches the difference-in-level DL earlier than the second wheel 5-2. That is, after the first wheel 5-1 climbs over the difference-in-level DL, the second wheel 5-2 reaches the difference-in-level DL. According to the present embodiment, information regarding the driving force when the first wheel 5-1 climbs over the difference-in-level DL is retained as "reference information". Then, the reference information is utilized for the driving force control when the second wheel 5-2 passes the difference-in-level DL. It is thus possible to efficiently control the driving force when the second wheel 5-2 passes the difference-in-level DL.

Figure 3:
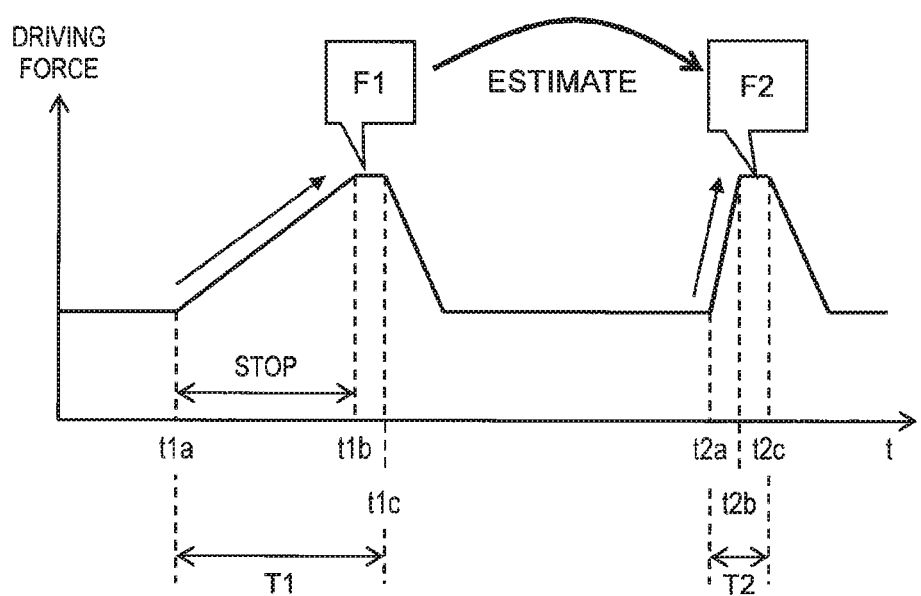
FIG. 3 is a timing chart showing an example of driving force control by the vehicle travel assist device according to the embodiment of the present disclosure.

FIG. 3 is a timing chart showing an example of the driving force control according to the present embodiment. A horizontal axis represents time, and a vertical axis represents the driving force.

At a time t1a, the first wheel 5-1 reaches and stops at the difference-in-level DL. The vehicle travel control device 200 increases the driving force. Here, the driving force may be gradually increased in order to suppress abrupt acceleration of the vehicle 1. At a time t1b, the first wheel 5-1 starts to move and climb up the difference-in-level DL. At a time t1c, the first wheel 5-1 climbs over the difference-in-level DL. A period from the time t1a to the time t1c is a first passing period T1 required for the first wheel 5-1 to pass the difference-in-level DL. After the first wheel 5-1 passes the difference-in-level DL, the driving force may be decreased in order to suppress unnecessary acceleration.

The driving force that is actually required for the first wheel 5-1 to climb over the difference-in-level DL is hereinafter referred to as a "first driving force F1". In the example shown in FIG. 3, the first driving force F1 is used as the "reference information".

A driving force required for the second wheel 5-2 to climb over the difference-in-level DL is hereinafter referred to as a "second driving force F2". After the first wheel 5-1 climbs over the difference-in-level DL, the vehicle travel control device 200 estimates the second driving force F2 from the first driving force F1 (the reference information). When a ratio of loads respectively applied to the first wheel 5-1 and the second wheel 5-2 is known, the second driving force F2 can be estimated based on the ratio and the first driving force F1. Then, when the second wheel 5-2 passes the difference-in-level, the vehicle travel control device 200 generates the estimated second driving force F2.

In the example shown in FIG. 3, at a time t2a, the second wheel 5-2 reaches and stops at the difference-in-level DL. The vehicle travel control device 200 increases the driving force. At this time, there is no need to gradually increase the driving force in order to suppress abrupt acceleration of the vehicle 1. Since the second driving force F2 required for the second wheel 5-2 to climb over the difference-in-level DL is already estimated, it is possible to "quickly" increase the driving force to the second driving force F2. In other words, it is possible to set a second increase rate when increasing the driving force to the second driving force F2 to be higher than a first increase rate when increasing the driving force to the first driving force F1. The vehicle travel control device 200 increases the driving force to the first driving force F1 at the first increase rate, and increases the driving force to the second driving force F2 at the second increase rate higher than the first increase rate.

At a time t2b, the second wheel 5-2 starts to move and climb up the difference-in-level DL. At a time t2c, the second wheel 5-2 climbs over the difference-in-level DL. A period from the time t2a to the time t2c is a second passing period T2 required for the second wheel 5-2 to pass the difference-in-level DL. Since the driving force can be quickly increased to the second driving force F2, the second passing period T2 is shorter than the first passing period T1.

Figure 4:
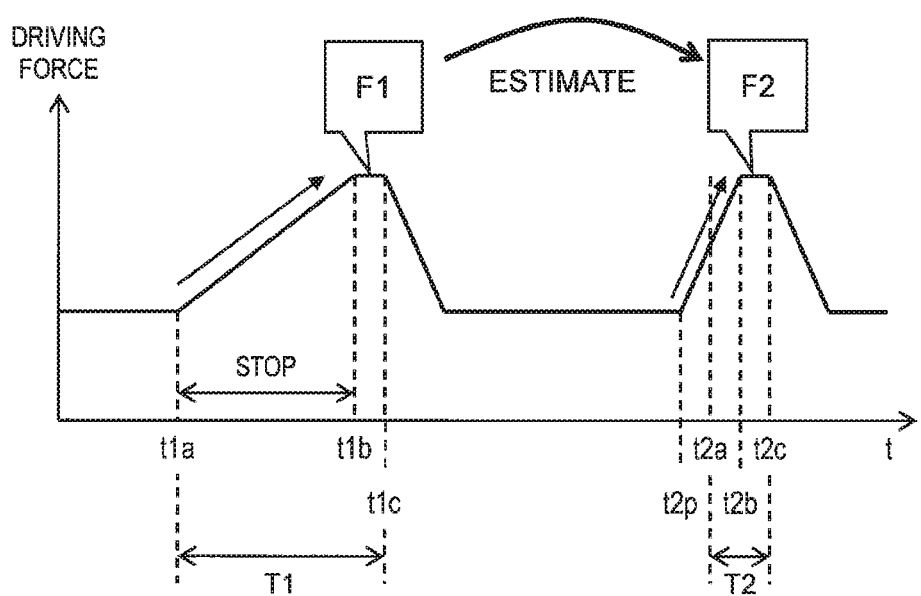
FIG. 4 is a timing chart showing another example of the driving force control by the vehicle travel assist device according to the embodiment of the present disclosure.

FIG. 4 shows a modification example of the driving force control shown in FIG. 3. A timing to increase the driving force is not limited to at or after the timing when the second wheel 5-2 reaches the difference-in-level DL. In the example shown in FIG. 4, the vehicle travel control device 200 increases the driving force from a time t2p before the second wheel 5-2 reaches the difference-in-level DL. The driving force control as shown in FIG. 4 also is possible if the timing when the second wheel 5-2 reaches the difference-in-level DL can be predicted, or approach of the second wheel 5-2 to the vicinity of the difference-in-level DL can be detected.

Figure 5:
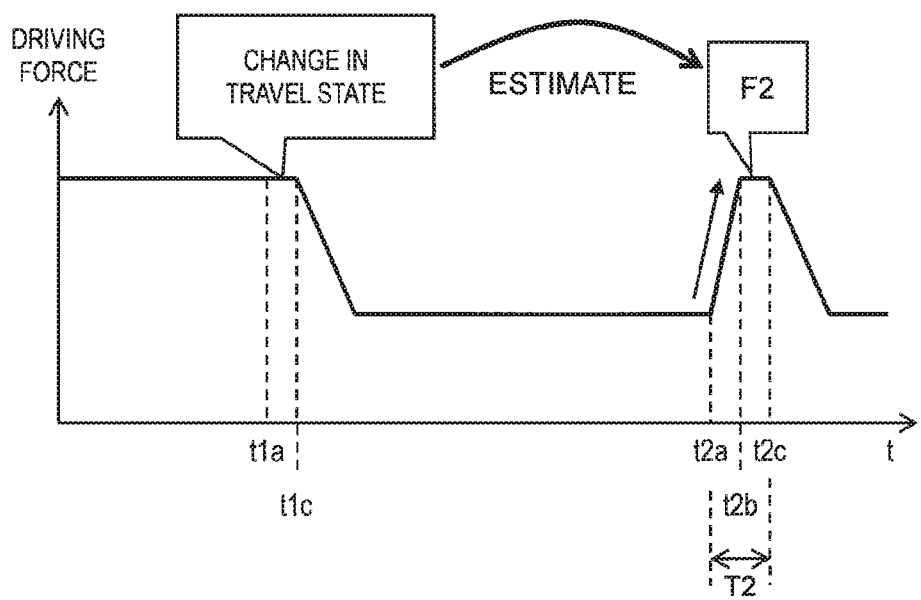
FIG. 5 is a timing chart showing still another example of the driving force control by the vehicle travel assist device according to the embodiment of the present disclosure.

FIG. 5 shows still another example of the driving force control according to the present embodiment. The first wheel 5-1 does not necessarily stop at the difference-in-level DL. In the example shown in FIG. 5, the first wheel 5-1 passes the difference-in-level DL without stopping. In this case, the second driving force F2 can be estimated by a method different from the ones described in FIGS. 3 and 4.

More specifically, the travel state such as the vehicle speed changes when the first wheel 5-1 passes the difference-in-level DL. The larger the difference-in-level DL is, the larger the change in the travel state is. That is to say, the change in the travel state when the first wheel 5-1 passes the difference-in-level DL reflects a height (size) of the difference-in-level DL. Therefore, the vehicle travel control device 200 can estimate the second driving force F2 required for the second wheel 5-2 to climb over the difference-in-level DL, based on the change in the travel state. That is, in the example shown in FIG. 5, the change in the travel state is used as the "reference information".

A situation where the second wheel 5-2 passes the difference-in-level DL is similar to that in the example shown in FIG. 3. At the time t2a, the second wheel 5-2 reaches and stops at the difference-in-level DL. The vehicle travel control device 200 increases the driving force. Since the second driving force F2 required for the second wheel 5-2 to climb over the difference-in-level DL is already estimated, it is possible to "quickly" increase the driving force to the second driving force F2.

Figure 6:
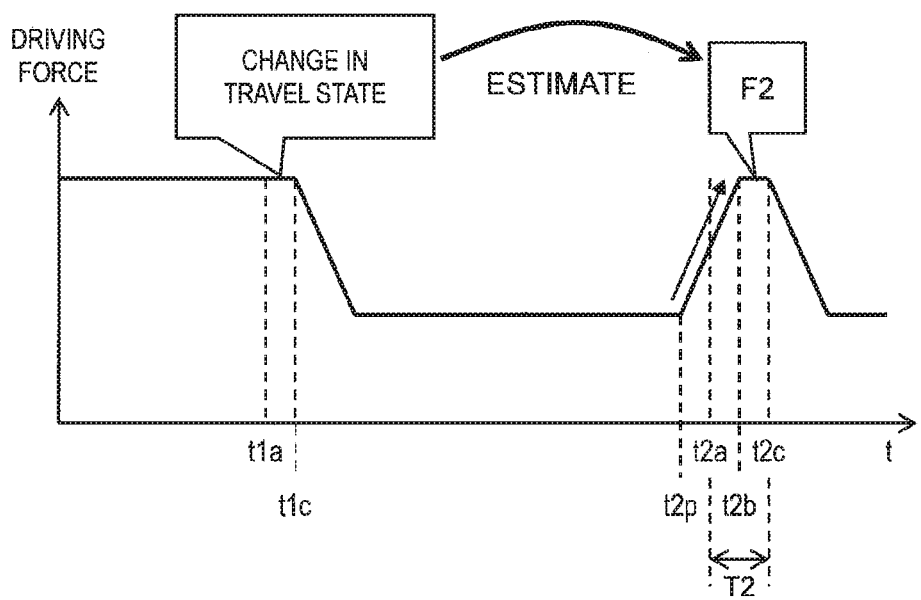
FIG. 6 is a timing chart showing still another example of the driving force control by the vehicle travel assist device according to the embodiment of the present disclosure.

FIG. 6 shows a modification example of the driving force control shown in FIG. 5. As in the case of the foregoing FIG. 4, the vehicle travel control device 200 increases the driving force from the time t2p before the second wheel 5-2 reaches the difference-in-level DL.

The processing by the vehicle travel control device 200 described above can be summarized as follows. First, it is necessary to detect that the first wheel 5-1 climbs over the difference-in-level DL. Based on the travel state information 300, the vehicle travel control device 200 can detect that the first wheel 5-1 climbs over the difference-in-level DL.

Subsequently, the vehicle travel control device 200 acquires the first driving force F1 required for the first wheel 5-1 to climb over the difference-in-level DL, as the reference information. Alternatively, the vehicle travel control device 200 acquires the change in the travel state when the first wheel 5-1 passes the difference-in-level DL, as the reference information. In either case, the vehicle travel control device 200 can acquire the reference information based on the travel state information 300.

Subsequently, the vehicle travel control device 200 estimates the second driving force F2 required for the second wheel 5-2 to climb over the difference-in-level DL, based on the reference information. Preferably, the vehicle travel control device 200 estimates the second driving force F2 before the second wheel 5-2 reaches the difference-in-level DL. Then, when the second wheel 5-2 passes the difference-in-level DL, the vehicle travel control device 200 generates the estimated second driving force F2.

As described above, according to the present embodiment, information when the first wheel 5-1 climbs over the difference-in-level DL is acquired as the reference information. Then, the second driving force F2 required for the second wheel 5-2 to climb over the difference-in-level DL is estimated from the reference information. Since the required second driving force F2 is estimated, it is possible to efficiently control the driving force when the second wheel 5-2 passes the difference-in-level DL.

As a comparative example, let us consider a case where the second driving force F2 is not estimated. According to the comparative example, when the driving force is increased so that the second wheel 5-2 climbs over the difference-in-level DL, the driving force may become unnecessarily large. In that case, the second wheel 5-2 dashes up the difference-in-level DL and the vehicle 1 accelerates abruptly. By contrast, according to the present embodiment, the necessary second driving force F2 is estimated and the vehicle 1 is driven by the estimated second driving force F2. It is thus possible to suppress the abrupt acceleration of the vehicle 1.

As another comparative example, the driving force may be gradually increased in order to suppress the abrupt acceleration of the vehicle 1. In that case, however, a stop time until the second wheel 5-2 starts to move becomes longer. In other words, a time during which the vehicle 1 does not move despite the increase in the driving force becomes longer. This causes increase in load applied to a driving device, reduction in fuel economy, increase in noise, and the like. By contrast, according to the present embodiment, the required second driving force F2 is estimated, and it is thus possible to quickly increase the driving force to the second driving force F2. This contributes to reduction in load applied to the driving device, increase in fuel economy, reduction in noise, and the like.

Hereinafter, the vehicle travel assist device 10 according to the present embodiment will be described in more detail.

2. Concrete Example of Vehicle Travel Assist Device

Figure 7:
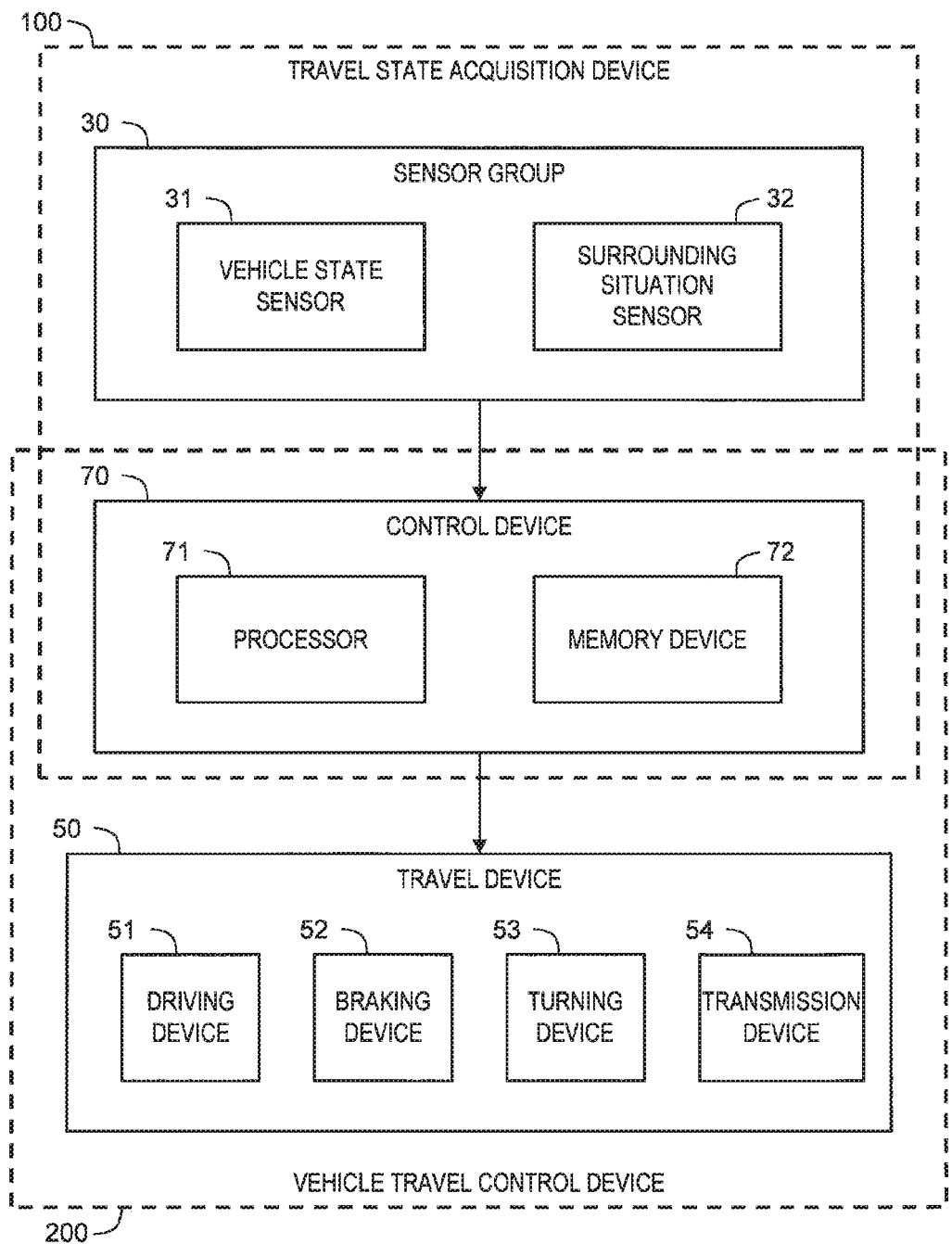
FIG. 7 is a block diagram showing a configuration example of the vehicle travel assist device according to the embodiment of the present disclosure.

FIG. 7 is a block diagram showing a configuration example of the vehicle travel assist device 10 according to the present embodiment. The vehicle travel assist device 10 includes a sensor group 30, a travel device 50, and a control device 70.

The sensor group 30 includes a vehicle state sensor 31 and a surrounding situation sensor 32.

The vehicle state sensor 31 detects a state of the vehicle 1. The state of the vehicle 1 is exemplified by a wheel speed, a vehicle speed, an acceleration (a longitudinal acceleration, a lateral acceleration, and a vertical acceleration), a steering angle, a suspension stroke amount, and the like. The vehicle state sensor 31 includes a wheel speed sensor, a vehicle speed sensor, a variety of acceleration sensors, a steering angle sensor, a stroke sensor, and the like. The vertical acceleration sensor and the stroke sensor are provided at a position of each wheel 5, for example. The vehicle state sensor 31 may further include a GPS (Global Positioning System) device that measures a position and an orientation of the vehicle 1.

The surrounding situation sensor 32 detects a situation around the vehicle 1. For example, the surrounding situation sensor 32 includes a camera, a sonar, a LIDAR (Laser Imaging Detection and Ranging), and the like. Using the surrounding situation sensor 32 makes it possible to perceive (recognize) space and objects around the vehicle 1.

The travel device 50 includes a driving device 51, a braking device 52, a turning device 53, and a transmission device 54. The driving device 51 is a power source that generates the driving force. The driving device 51 is exemplified by an engine, an electric motor, and an in-wheel motor. The braking device 52 generates a braking force. The turning device 53 turns the wheel 5. For example, the turning device 53 includes a power steering device (e.g., EPS: Electric Power Steering).

The control device (i.e. a controller) 70 is a microcomputer provided with a processor 71 and a memory device 72. The control device 70 is also called an ECU (Electronic Control Unit). A control program is stored in the memory device 72. A variety of processing by the control device 70 is achieved by the processor 71 executing the control program stored in the memory device 72.

For example, the control device 70 (the processor 71) executes the vehicle travel control by appropriately controlling an operation of the travel device 50. The vehicle travel control includes driving force control, braking force control, steering control, and gear control. The driving force control is performed through the driving device 51. The braking force control is performed through the braking device 52. The steering control is performed through the turning device 53. The gear control is performed through the transmission device 54. It can be said that the control device 70 and the travel device 50 constitute the "vehicle travel control device 200" shown in FIG. 1.

Moreover, the control device 70 (the processor 71) executes a variety of information processing. More specifically, the control device 70 (the processor 71) acquires a variety information and stores the acquired information in the memory device 72. The control device 70 reads necessary information from the memory device 72 to execute a variety of information processing.

Figure 8:
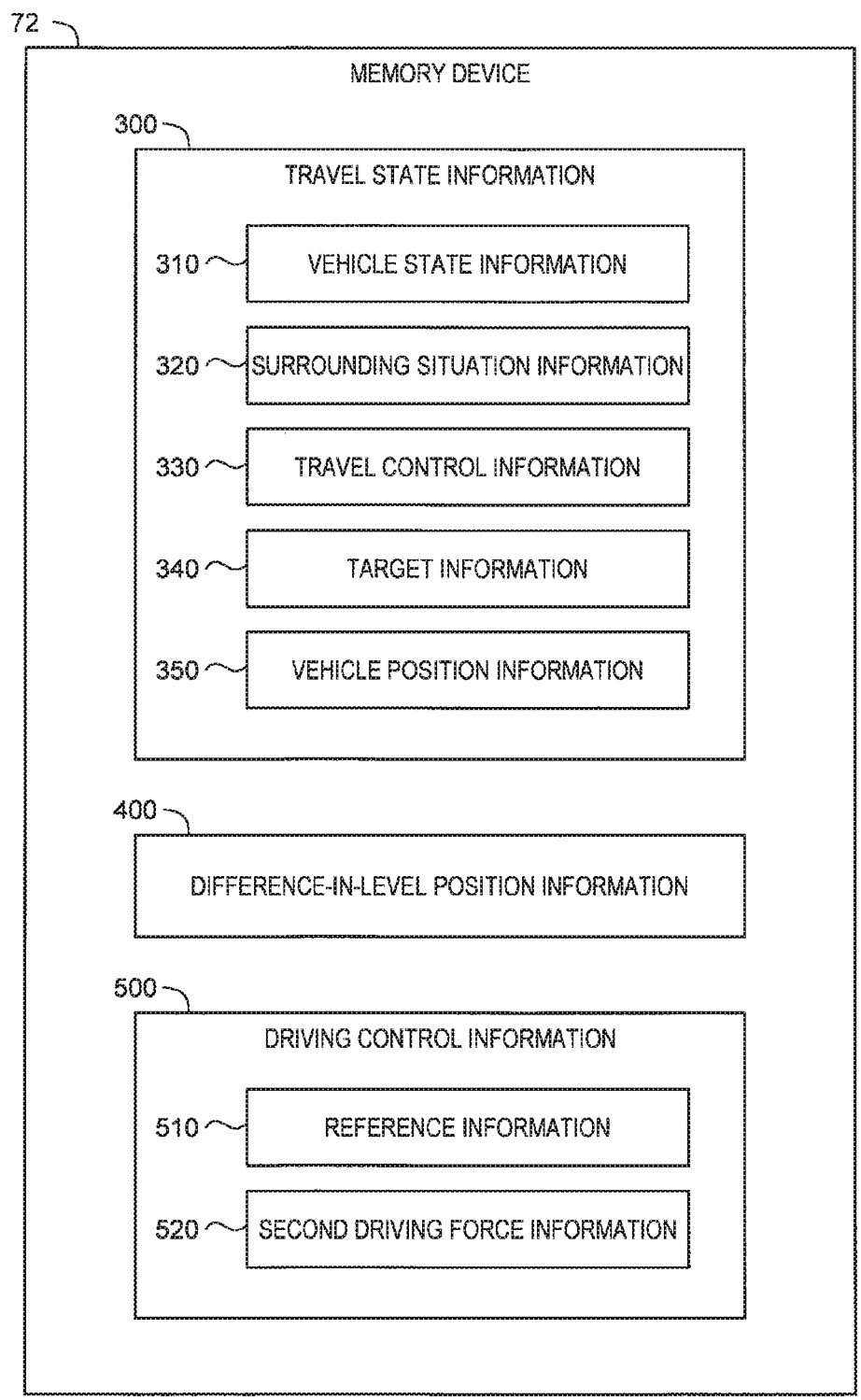
FIG. 8 is a block diagram showing an example of a variety of information used in the embodiment of the present disclosure.

FIG. 8 is a block diagram showing an example of a variety of information used in the present embodiment. The travel state information 300, difference-in-level position information 400, and driving control information 500 are stored in the memory device 72. The travel state information 300 indicates the travel state of the vehicle 1. The difference-in-level position information 400 indicates a position of the difference-in-level DL on a travel path of the vehicle 1. The driving control information 500 is information used in the driving force control relating to the difference-in-level passing. Hereinafter, acquisition and utilization of the variety of information will be described in detail.

3. Travel State Information 300

The control device 70 acquires the travel state information 300 indicating the travel state of the vehicle 1. As shown in FIG. 8, the travel state information 300 includes vehicle state information 310, surrounding situation information 320, travel control information 330, target information 340, and vehicle position information 350.

3-1. Vehicle State Information 310

The vehicle state information 310 indicates the state of the vehicle 1. The control device 70 acquires the vehicle state information 310 based on a result of detection by the vehicle state sensor 31. The state of the vehicle 1 is exemplified by the wheel speed, the vehicle speed, the acceleration (the longitudinal acceleration, the lateral acceleration, and the vertical acceleration), the steering angle, the suspension stroke amount, and the like. As to the vertical acceleration and the suspension stroke amount, their values at the position of each wheel 5 are calculated.

When the vehicle state sensor 31 includes the GPS device, the vehicle state information 310 may include position information regarding the vehicle 1 that is acquired by the GPS device.

3-2. Surrounding Situation Information 320

The surrounding situation information 320 indicates the situation around the vehicle 1. The control device 70 acquires the surrounding situation information 320 based on a result of detection by the surrounding situation sensor 32. For example, the surrounding situation information 320 includes image information obtained by the camera. Moreover, the surrounding situation information 320 includes object information regarding a surrounding object (e.g. a wall) measured by the sonar and the LIDAR. The object information indicates a relative position of the surrounding object (i.e. a distance to the surrounding object). The object information may further indicate a relative velocity.

The difference-in-level DL near the vehicle 1 may be detected by the surrounding situation sensor 32. In that case, the surrounding situation information 320 may include information indicating a relative position of the detected difference-in-level DL.

3-3. Travel Control Information 330

The travel control information 330 indicates a control amount of the travel device 50 controlled by the control device 70 (i.e. the vehicle travel control device 200). For example, the travel control information 330 indicates the driving force and the braking force that are controlled by the control device 70.

3-4. Target Information 340

Figure 9:
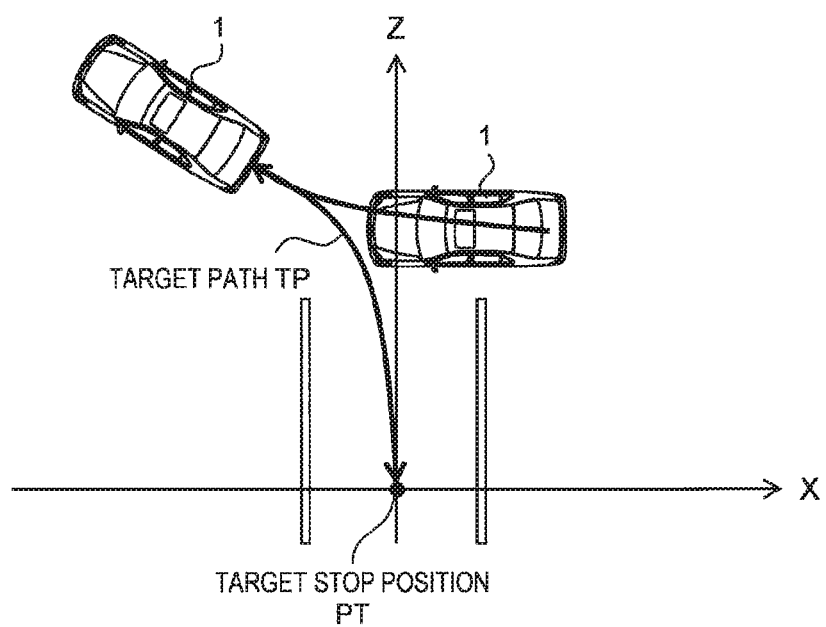
FIG. 9 is a conceptual diagram for explaining target information used in the embodiment of the present disclosure.

FIG. 9 is a conceptual diagram for explaining the target information 340. The control device 70 (i.e. the vehicle travel control device 200) can execute the vehicle guidance control that moves the vehicle 1 and stops it at a target stop position PT. For example, the vehicle guidance control is utilized when parking the vehicle 1 at a desired parking position. When such the vehicle guidance control is executed, the target information 340 indicating the target stop position PT is created.

The target stop position PT is beforehand set manually or by the control device 70. For example, the control device 70 automatically determines an appropriate target stop position PT, based on the above-described surrounding situation information 320. Alternatively, the control device 70 displays information indicating space and objects around the vehicle 1 on an HMI (Human Machine Interface), based on the surrounding situation information 320. Then, a user of the vehicle 1 refers to the displayed information to designate a desired target stop position PT.

After the target stop position PT is set, the control device 70 may generate a target path TP from a current position of the vehicle 1 to the target stop position PT. The target path TP is defined, for example, in a coordinate system whose origin is at the target stop position PT. When the target path TP is generated, the target information 340 indicates the target stop position PT and the target path TP. The control device 70 (i.e. the vehicle travel control device 200) executes the vehicle travel control such that the vehicle 1 travels along the target path TP.

3-5. Vehicle Position Information 350

Figure 10:
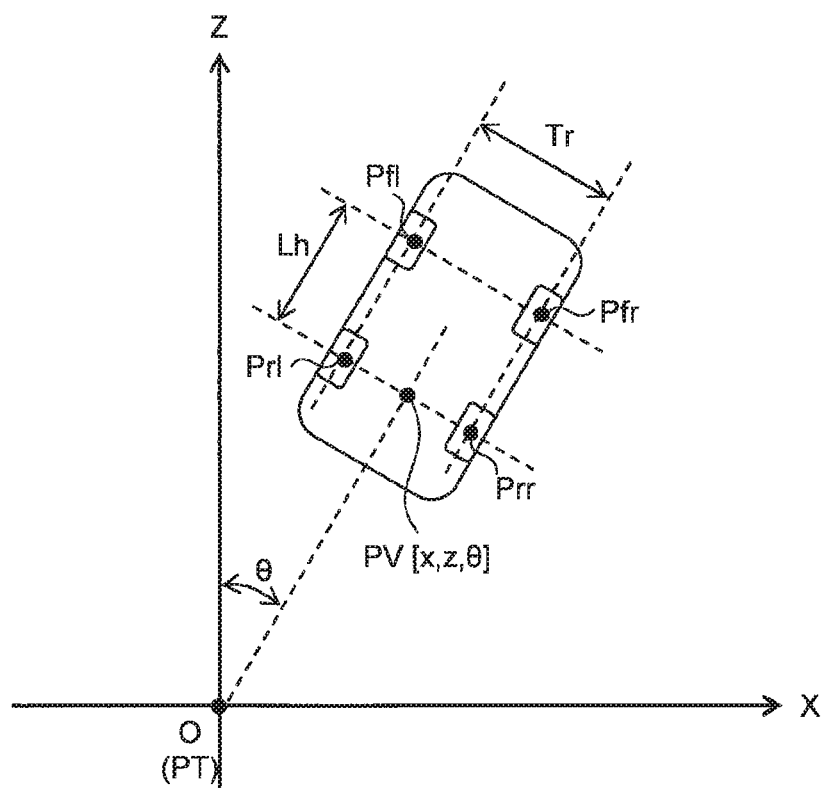
FIG. 10 is a conceptual diagram for explaining vehicle position information used in the embodiment of the present disclosure.

FIG. 10 is a conceptual diagram for explaining the vehicle position information 350. The vehicle position information 350 indicates a position of the vehicle 1 and a position of each wheel 5. The positions of the vehicle 1 and each wheel 5 are defined in a predetermined coordinate system. For example, a coordinate system whose origin O is at the above-described target stop position PT is used as the predetermined coordinate system. However, the predetermined coordinate system is not limited to that.

In FIG. 10, a vehicle position PV[x, z, θ] represents the position of the vehicle 1. For example, an intermediate position between the left rear wheel 5RL and the right rear wheel 5RR is used as the vehicle position PV. Wheel positions Pfl, Pfr, Prl, and Prr represent respective positions of the left front wheel 5FL, the right front wheel 5FR, the left rear wheel 5RL, and the right rear wheel 5RR. A wheelbase Lh and a track width Tr are known parameters. Using the vehicle position PV and the known parameters, the wheel positions Pfl, Pfr, Prl, and Prr are expressed by the following Equations (1) to (4), respectively.

[Equation 1]
$$Pfl = \begin{bmatrix} x - \frac{Tr}{2}\cos\theta + Lh \cdot \sin\theta \\ z + \frac{Tr}{2}\cos\theta + Lh \cdot \cos\theta \end{bmatrix} \quad (1)$$

[Equation 2]
$$Pfr = \begin{bmatrix} x + \frac{Tr}{2}\cos\theta + Lh \cdot \sin\theta \\ z - \frac{Tr}{2}\cos\theta + Lh \cdot \cos\theta \end{bmatrix} \quad (2)$$

[Equation 3]
$$Prl = \begin{bmatrix} x - \frac{Tr}{2}\cos\theta \\ z + \frac{Tr}{2}\sin\theta \end{bmatrix} \quad (3)$$

[Equation 4]
$$Prr = \begin{bmatrix} x + \frac{Tr}{2}\cos\theta \\ z - \frac{Tr}{2}\sin\theta \end{bmatrix} \quad (4)$$

The control device 70 calculates and updates the vehicle position PV and the wheel positions Pfl, Pfr, Prl, and Prr based on the vehicle state information 310. More specifically, the vehicle state information 310 includes the steering angle and the wheel speed. Based on the steering angle and the wheel speed, the control device 70 can calculate an amount of movement of the vehicle 1 to sequentially calculate and update the vehicle position PV. When the vehicle position PV is updated, the wheel positions Pfl, Pfr, Prl, and Prr also are updated in accordance with the above Equations (1) to (4).

As another example, when the vehicle state information 310 includes the position information regarding the vehicle 1 that is acquired by the GPS device, the control device 70 may utilize the position information. As still another example, the control device 70 may calculate and update the vehicle position PV based on the relative position with respect to the surrounding object (e.g. a wall) indicated by the surrounding situation information 320.

3-6. Travel State Acquisition Device 100

As shown in FIG. 7, it can be said that the sensor group 30 and the control device 70 constitute the "travel state acquisition device 100".

4. Difference-In-Level Position Information 400

The difference-in-level position information 400 indicates a position of the difference-in-level DL on the travel path of the vehicle 1. Such the difference-in-level position information 400 is useful for the vehicle travel control. Hereinafter, an example of a method of acquiring the difference-in-level position information 400 will be described.

4-1. First Example

Based on the travel state information 300, the control device 70 detects that any wheel 5 passes the difference-in-level DL and identifies the wheel 5 that passes the difference-in-level DL.

Figure 11:
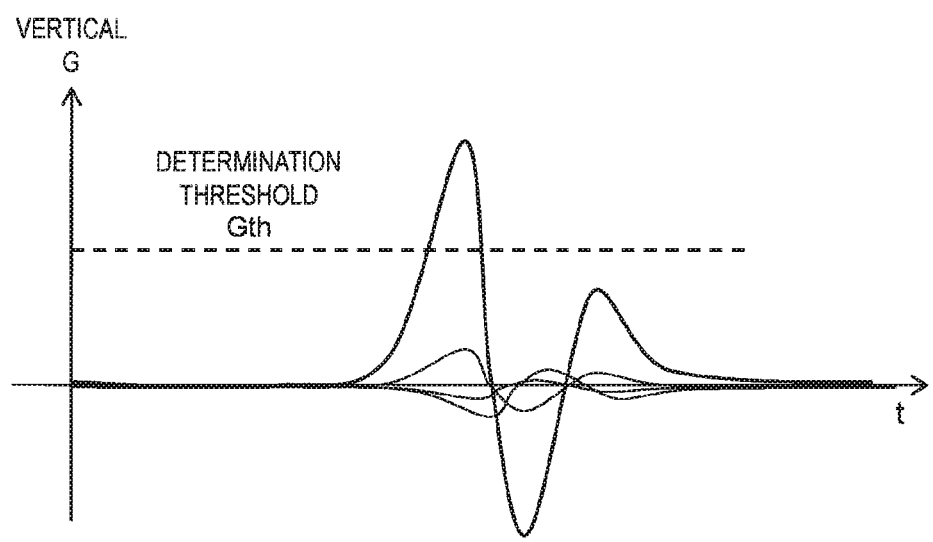
FIG. 11 is a conceptual diagram for explaining an example of a method of detecting difference-in-level passing in the embodiment of the present disclosure.

FIG. 11 is a conceptual diagram for explaining an example of a method of detecting the difference-in-level passing. A horizontal axis represents time, and a vertical axis represents the vertical acceleration at the position of each wheel 5. The vertical acceleration is obtained from the vehicle state information 310. When the vertical acceleration at a position of a certain wheel 5 exceeds a determination threshold Gth, the control device 70 determines that said certain wheel 5 passes the difference-in-level DL. In this manner, it it possible by referring to the vertical acceleration to detect that any wheel 5 passes the difference-in-level DL and identify the wheel 5 that passes the difference-in-level DL. The stroke amount may be taken into consideration instead of or together with the vertical acceleration.

As another example, the control device 70 may detect the difference-in-level passing based on changes in the vehicle speed and the longitudinal acceleration indicated by the vehicle state information 310. As still another example, the control device 70 may detect the difference-in-level passing and identify the wheel 5 that passes the difference-in-level DL, based on a change in the camera's field of vision indicated by the surrounding situation information 320.

It should be noted that there are not only cases where the wheel 5 climbs up the difference-in-level DL but also cases where the wheel 5 goes down the difference-in-level DL. Climbing up and going down are distinguishable based on the change in the vehicle speed or the change in the camera's field of vision.

After identifying the wheel 5 that passes the difference-in-level DL, the control device 70 acquires the wheel position of the wheel 5 when passing the difference-in-level DL, based on the vehicle position information 350. The wheel position of the wheel 5 when passing the difference-in-level DL is hereinafter referred to as a "passing position". For example, the wheel position at a timing when the wheel 5 comes into contact with the difference-in-level DL is used as the passing position. As another example, an average of the wheel positions during the passing period may be used as the passing position.

The control device 70 acquires the passing positions regarding at least two different wheels 5 by the above-described method. The two wheels 5 may pass the difference-in-level DL at different timings or may concurrently pass the difference-in-level DL.

Figure 12:
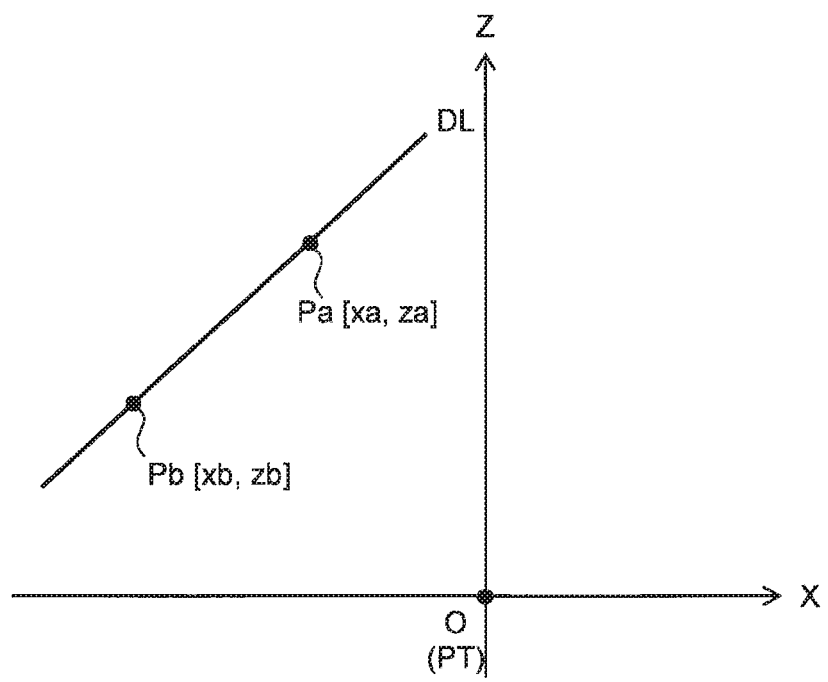
FIG. 12 is a conceptual diagram for explaining an example of a method of estimating a difference-in-level position in the embodiment of the present disclosure.

FIG. 12 shows respective passing positions Pa and Pb of two wheels 5a and 5b. A first passing position Pa[xa, za] is the passing position of the wheel 5a. A second passing position Pb[xb, zb] is the passing position of the wheel 5b. The first passing position Pa and the second passing position Pb are different from each other. Information of the first passing position Pa and the second passing position Pb is stored in the memory device 72. The control device 70 assumes a position of a line connecting the first passing position Pa and the second passing position Pb as the position of the difference-in-level DL. The position of the difference-in-level DL in the above-mentioned predetermined coordinate system is expressed by the following Equation (5).

[Equation 5]

$$z = \left(\frac{za - zb}{xa - xb}\right)(x - xa) + za \quad (5)$$

As described above, according to the first example, the control device 70 detects that the two wheels 5a and 5b pass the difference-in-level DL and then estimates the position of the difference-in-level DL based on the first passing position Pa and the second passing position Pb. Using the passing position at which the wheel 5 actually passes the difference-in-level DL makes it possible to estimate the position of the difference-in-level DL with high accuracy.

4-2. Second Example

It is also possible that the surrounding situation sensor 32 (e.g. the LIDAR) detects the difference-in-level DL. In that case, the surrounding situation information 320 includes relative position information of the detected difference-in-level DL. According to the second example, the control device 70 calculates the position of the difference-in-level DL in the predetermined coordinate system based on the relative position information of the difference-in-level DL included in the surrounding situation information 320. In the case of the second example, it is possible to acquire the position of the difference-in-level DL even before the two wheels 5a and 5b pass the difference-in-level DL.

4-3. Difference-In-Level Position Estimation Device

It can be said that the control device 70 serves as a "difference-in-level position estimation device". Based on the travel state information 300, the difference-in-level position estimation device estimates the position of the difference-in-level DL on the travel path of the vehicle 1 to acquire the difference-in-level position information 400.

More specifically, in the case of the first example, the difference-in-level position estimation device detects that the two wheels 5a and 5b pass the difference-in-level DL, based on the travel state information 300. Then, the difference-in-level position estimation device acquires respective wheel positions of the two wheels 5a and 5b when passing the difference-in-level DL as the first passing position Pa and the second passing position Pb, based on the vehicle position information 350. Then, the difference-in-level position estimation device assumes the position of the line connecting the first passing position Pa and the second passing position Pb as the position of the difference-in-level DL.

In the case of the second example, the difference-in-level position estimation device estimates the position of the difference-in-level DL based on the surrounding situation information 320.

5. Driving Force Control Relating to Difference-In-Level Passing

Next, let us describe the driving force control relating to the difference-in-level passing. In the driving force control, the driving control information 500 shown in FIG. 8 is acquired and utilized. The driving control information 500 includes reference information 510 and second driving force information 520.

5-1. First Example

Figure 13:
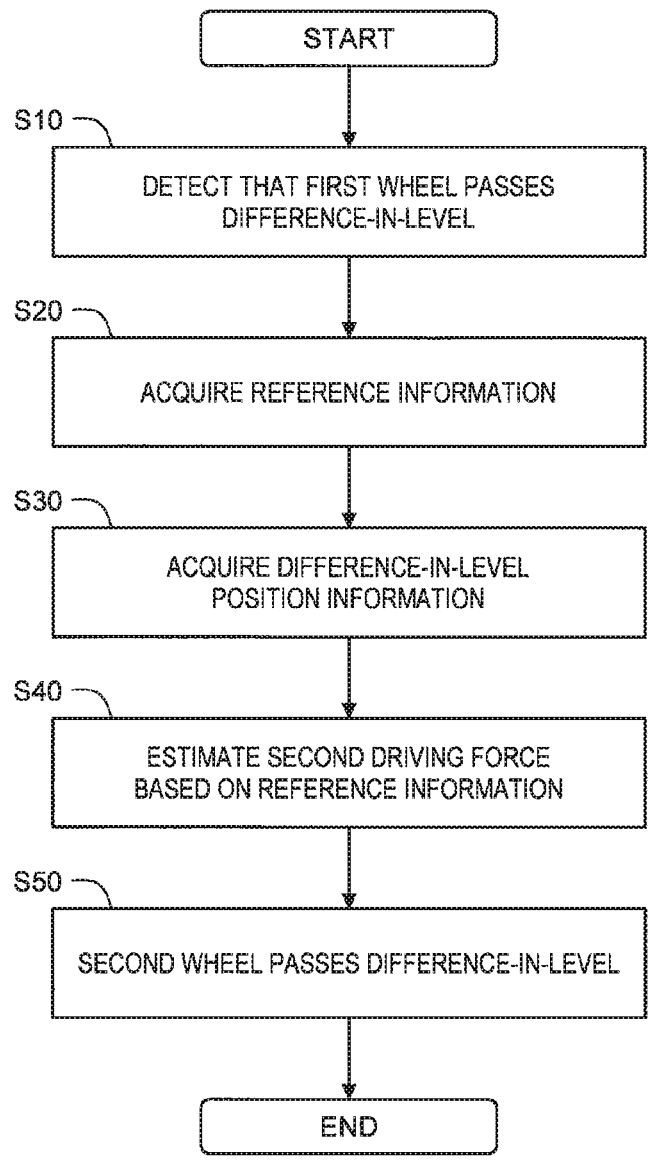
FIG. 13 is a flow chart showing a first example of the driving force control relating to the difference-in-level passing in the embodiment of the present disclosure.

FIG. 13 is a flow chart showing a first example of the driving force control relating to the difference-in-level passing. In the first example, let us consider the case described in the foregoing FIGS. 3 and 4 where the first wheel 5-1 reaches and stops at the difference-in-level DL.

5-1-1. Step S10

Based on the travel state information 300, the vehicle travel control device 200 detects that any wheel 5 stops due to the difference-in-level DL. For example, when the vehicle 1 does not move despite generation of the driving force, the vehicle travel control device 200 determines that any wheel 5 stops due to the difference-in-level DL.

The vehicle travel control device 200 increases the driving force in order to climb over the difference-in-level DL. Here, the driving force may be gradually increased in order to suppress abrupt acceleration of the vehicle 1. The increase rate of the driving force at this time is the first increase rate described above.

Due to the increase in the driving force, the wheel 5 climbs over the difference-in-level DL. Based on the travel state information 300, the vehicle travel control device 200 detects that the wheel 5 climbs over the difference-in-level DL and identifies the wheel 5 that climbs over the difference-in-level DL (see FIG. 11 and the first example 4-1 in Section 4). The wheel 5 identified here is the first wheel 5-1.

5-1-2. Step S20

After the first wheel 5-1 climbs over the difference-in-level DL, the vehicle travel control device 200 acquires the reference information 510 based on the travel state information 300. The acquired reference information 510 is stored in the memory device 72.

The reference information 510 indicates the first wheel 5-1 identified in Step S10. When a single first wheel 5-1 passes the difference-in-level DL, the reference information 510 indicates the single first wheel 5-1. When two first wheels 5-1 concurrently pass the difference-in-level DL, the reference information 510 indicates the two first wheels 5-1.

In addition, the reference information 510 includes the passing position at which the first wheel 5-1 passes the difference-in-level DL in Step S10. The vehicle travel control device 200 can acquire the passing position based on the vehicle position information 350 (see the first example 4-1 in Section 4).

Furthermore, the reference information 510 includes the first driving force F1 required for the first wheel 5-1 to climb over the difference-in-level DL in Step S10. The vehicle travel control device 200 can acquire the first driving force F1 based on the travel control information 330.

5-1-3. Step S30

The vehicle travel control device 200 repeats the above-described Steps S10 and S20 until at least two first wheels 5-1 pass the difference-in-level DL. The two first wheels 5-1 may pass the difference-in-level D at different timings or may concurrently pass the difference-in-level DL.

After the two first wheels 5-1 pass the difference-in-level DL, the vehicle travel control device 200 estimates the position of the difference-in-level DL by the method described in FIG. 12 to acquire the difference-in-level position information 400. More specifically, the two first wheels 5-1 correspond to the wheels 5a and 5b shown in FIG. 12. The reference information 510 includes the first passing position Pa of the wheel 5a and the second passing position Pb of the wheel 5b. The vehicle travel control device 200 assumes a position of a line connecting the first passing position Pa and the second passing position Pb as the position of the difference-in-level DL (see the first example 4-1 in Section 4). The acquired difference-in-level position information 400 is stored in the memory device 72.

5-1-4. Step S40

Subsequently, the vehicle travel control device 200 estimates the second driving force F2 required for the second wheel 5-2 to climb over the difference-in-level DL, based on the reference information 510. Preferably, the vehicle travel control device 200 estimates the second driving force F2 before the second wheel 5-2 reaches the difference-in-level DL.

Let us consider a "first load W1" and a "second load W2" for explaining estimation of the second driving force F2. The first load W1 is a load applied to the first wheel 5-1 concurrently passing the difference-in-level DL. The first load W1 depends on the number of the first wheel 5-1 concurrently passing the difference-in-level DL (the number is hereinafter referred to as a first wheel number N1). The first load W1 in a case of N1=2 is naturally larger than the first load W1 in a case of N1=1. Similarly, the second load W2 is a load applied to the second wheel 5-2 concurrently passing the difference-in-level DL. The second load W2 depends on the number of the second wheel 5-2 concurrently passing the difference-in-level DL (the number is hereinafter referred to as a second number of wheels N2).

There is a correlation between the first driving force F1 and the first load W1. Similarly, there is a correlation between the second driving force F2 and the second load W2. There is a relationship between the first load W1, the second load W2, the first driving force F1, and the second driving force F2 as expressed by the following Equation (6).

[Equation 6]

$$F2 = \frac{M2}{M1} \times F1 \qquad (6)$$

In Equation (6), a first mass M1 is a mass equivalent to the first load W1 (W1=M1×g, g=gravitational acceleration). A second mass M2 is a mass equivalent to the second load W2 (W2=M2×g). A ratio of the first mass M1 and the second mass M2 is equal to a ratio of the first load W1 and the second load W2. As indicated by Equation (6), the second driving force F2 can be calculated based on the first driving force F1 and the ratio of the first load W1 and the second load W2.

As mentioned above, the reference information 510 indicates the first wheel 5-1 identified in Step S10 and the first driving force F1. Therefore, the vehicle travel control device 200 can acquire the first load W1 and the first driving force F1 based on the reference information 510.

The second load W2 is acquired as follows. The vehicle travel control device 200 first estimates the second wheel 5-2 that will reach the difference-in-level DL after the first wheel 5-1. More specifically, the vehicle travel control device 200 estimates the second wheel 5-2 based on the travel state information 300 and the difference-in-level position information 400. The vehicle position information 350 indicates the latest wheel position of each wheel 5. The vehicle state information 310 indicates the steering angle and the wheel speed. The difference-in-level position information 400 indicates the position of the difference-in-level DL. Based on such the information, it is possible to detect that another wheel 5 different from the first wheel 5-1 is likely to reach the difference-in-level DL after the first wheel 5-1. The said another wheel 5 is the second wheel 5-2.

When the target path TP is set, the vehicle travel control device 200 executes the vehicle travel control such that the vehicle 1 travels along the target path TP. In this case, the vehicle travel control device 200 may estimate the second wheel 5-2 in consideration of the target path TP (i.e. the target information 340) as well.

The number of the second wheel 5-2 concurrently passing the difference-in-level DL, that is, the second wheel number N2 may be one or two. The second load W2 is the load applied to the second wheel 5-2 concurrently passing the difference-in-level DL. The vehicle travel control device 200 can estimate the second wheel 5-2 and the second load W2 based on the travel state information 300 and the difference-in-level position information 400.

Then, the vehicle travel control device 200 calculates the second driving force F2 in accordance with the above-described Equation (6). That is, the vehicle travel control device 200 estimates the second driving force F2 based on the first driving force F1 and the ratio of the first load W1 and the second load W2. The second driving force information 520 indicates the estimated second driving force F2. The second driving force information 520 is stored in the memory device 72.

5-1-5. Step S50

When the second wheel 5-2 passes the difference-in-level DL after the first wheel 5-1, the vehicle travel control device 200 generates the second driving force F2 indicated by the second driving force information 520 (see FIGS. 3 and 4).

In the example shown in FIG. 3, the second wheel 5-2 reaches and stops at the difference-in-level DL at the time t2a. The vehicle travel control device 200 "quickly" increases the driving force to the second driving force F2. The increase rate of the driving force at this time is the second increase rate higher than the above-mentioned first increase rate. At the time t2b, the second wheel 5-2 starts to move and climb up the difference-in-level DL. At the time t2c, the second wheel 5-2 climbs over the difference-in-level DL. Since the driving force can be quickly increased to the second driving force F2, the second passing period T2 is shorter than the first passing period T1.

In the example shown in FIG. 4, the vehicle travel control device 200 increases the driving force from the time t2p before the second wheel 5-2 reaches the difference-in-level DL. For example, when the second wheel 5-2 enters a predetermined range before the position of the difference-in-level DL, the vehicle travel control device 200 starts to increase the driving force. The latest position of the second wheel 5-2 is obtained from the vehicle position information 350. The position of the difference-in-level DL is obtained from the difference-in-level position information 400.

In order to suppress shock when the second wheel 5-2 passes the difference-in-level DL, the vehicle travel control device 200 may substantially slow down the vehicle 1 before the second wheel 5-2 reaches the difference-in-level DL.

5-2. Second Example

In a second example, let us consider the case described in FIGS. 5 and 6 where the first wheel 5-1 passes the difference-in-level DL without stopping. The flow chart is the same as in the case of the first example described above (see FIG. 13). An overlapping description with the first example will be omitted as appropriate.

5-2-1. Step S10

The first wheel 5-1 passes the difference-in-level DL without stopping. Based on the travel state information 300, the vehicle travel control device 200 detects that a wheel 5 passes the difference-in-level DL and identifies the wheel 5 that passes the difference-in-level DL (see FIG. 11 and the first example 4-1 in Section 4). The wheel 5 identified here is the first wheel 5-1.

5-2-2. Step S20

After the first wheel 5-1 passes the difference-in-level DL, the vehicle travel control device 200 acquires the reference information 510 based on the travel state information 300. In the second example, the reference information 510 does not include the first driving force F1. Instead of the first driving force F1, the reference information 510 indicates a change in the travel state when the first wheel 5-1 passes the difference-in-level DL.

For example, when the first wheel 5-1 passes the difference-in-level DL, the vehicle speed (i.e. a kinetic energy) changes. The vehicle speed is obtained from the vehicle state information 310. Based on the vehicle state information 310, the vehicle travel control device 200 acquires the change in the vehicle speed (the kinetic energy) when the first wheel 5-1 passes the difference-in-level DL.

5-2-3. Step S30

The vehicle travel control device 200 estimates the position of the difference-in-level DL to acquire the difference-in-level position information 400, as in the case of the first example.

5-2-4. Step S40

As in the case of the first example, the vehicle travel control device 200 estimates the second wheel 5-2 and the second load W2 based on the travel state information 300 and the difference-in-level position information 400. Furthermore, the vehicle travel control device 200 estimates the second driving force F2 based on the reference information 510.

In the second example, the vehicle travel control device 200 first estimates a height h of the difference-in-level DL based on the change in the travel state indicated by the reference information 510. Since the change in the travel state becomes larger as the difference-in-level DL becomes larger, it is possible to estimate the height h of the difference-in-level DL from the change in the travel state.

For example, the change in the travel state is the change in the vehicle speed (the kinetic energy). From a standpoint of the law of conservation of energy, the following Equation (7) is satisfied.

[Equation 7]

$$\tfrac{1}{2}M(Vs^2 - Vo^2) \times C = M1 \times g \times h \qquad (7)$$

In Equation (7), M is a total mass of the vehicle 1, M1 is the first mass equivalent to the above-described first load W1 regarding the first wheel 5-1 (W1=M1×g, g=gravitational acceleration), Vs is the vehicle speed after the first wheel 5-1 passes the difference-in-level DL, Vo is the vehicle speed before the first wheel 5-1 passes the difference-in-level DL, and C is a correction coefficient representing energy dissipation. In a case of climbing up the difference-in-level DL, the correction coefficient C is equal to or smaller than −1 (C≤−1). In a case of going down the difference-in-level DL, the correction coefficient C is equal to or larger than 1 (C≥1). The following Equation (8) is obtained from Equation (7).

[Equation 8]

$$h = \frac{M(Vs^2 - Vo^2)}{2 \times M1 \times g} \times C \qquad (8)$$

The vehicle travel control device 200 estimates the height h of the difference-in-level DL in accordance with Equation (8). That is to say, the vehicle travel control device 200 estimates the height h of the difference-in-level DL based on the first load W1 and the change in the vehicle speed. Furthermore, based on the height h of the difference-in-level DL and the second load W2, the vehicle travel control device 200 estimates the second driving force F2 required for the second wheel 5-2 to climb over the difference-in-level DL.

Figure 14:
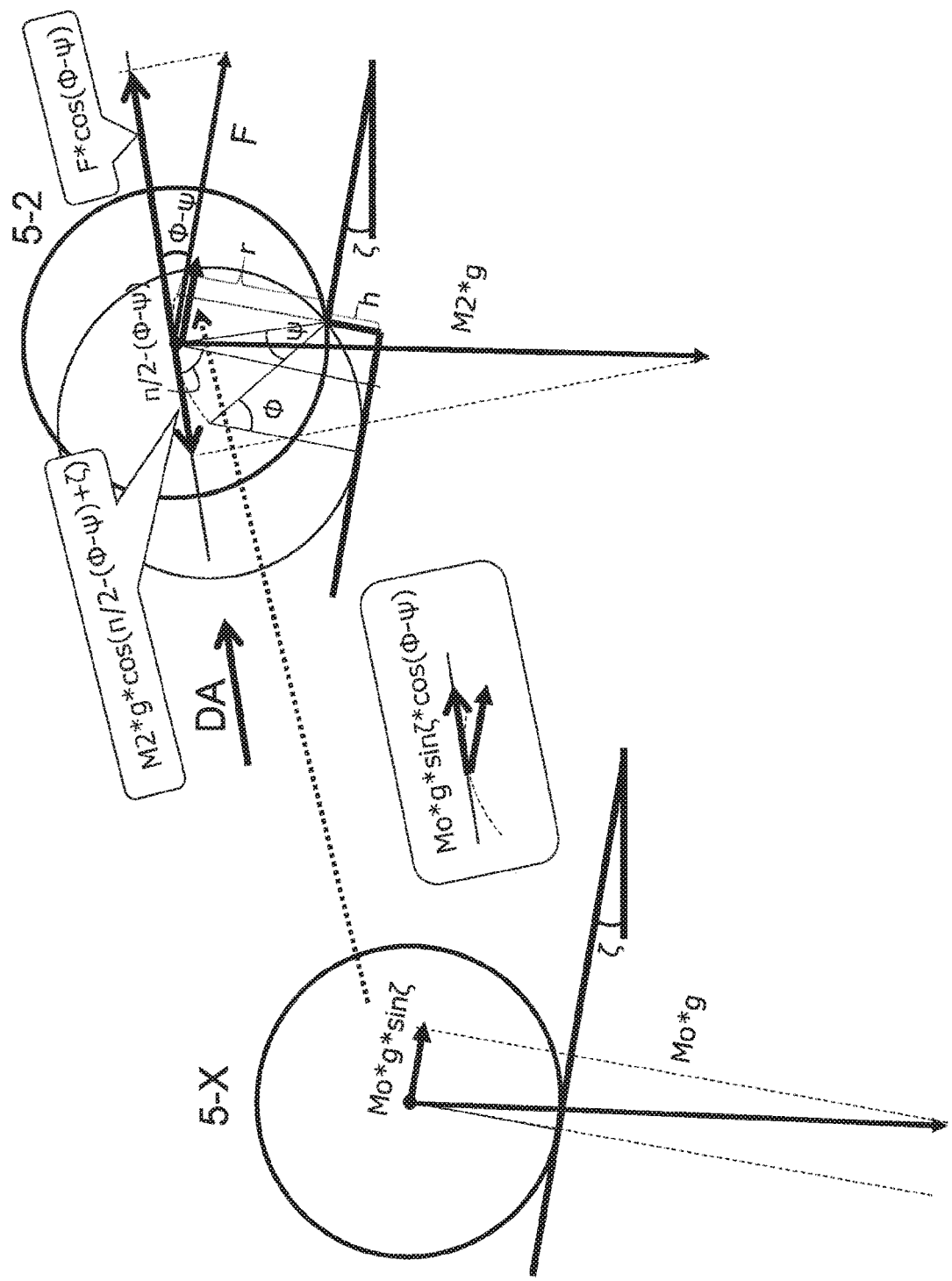
FIG. 14 is a conceptual diagram for explaining an example of a method of estimating a second driving force in the embodiment of the present disclosure.

FIG. 14 is a conceptual diagram for explaining a method of estimating the second driving force F2. In FIG. 14, the driving force F causes the second wheel 5-2 to climb up the difference-in-level DL of the height h. M2 is the second mass equivalent to the above-described second load W2 regarding the second wheel 5-2 (W2=M2×g, g=gravitational acceleration), "r" is a dynamic rolling radius of the second wheel 5-2, ψ is an angle of rotation of the second wheel 5-2 from a passing start point (i.e. a contact point), ζ is a slope of a road surface that is calculated by the acceleration sensor, Mo is a mass equivalent to a load applied to wheels 5-X other than the second wheel 5-2, and DA is a direction in which the second wheel 5-2 proceeds. Using an acceleration A in the direction DA, a mass M (M=M2+Mo) of the vehicle 1, and the driving force F, an equation of motion is expressed by the following Equation (9).

[Equation 9]

$$M \times A = F \times \cos(\phi - \psi) - M2 \times g \times \cos\left\{\frac{\pi}{2} - (\phi - \psi) + \zeta\right\} + Mo \times g \times \sin\zeta \times \cos(\phi - \psi) \quad (5)$$

The following Equation (10) is obtained from Equation (9).

[Equation 10]

$$M \times A = (\cos\phi \cos\psi + \sin\phi \sin\psi)(F + M \times g \times \sin\zeta) - M2 \times g \times (\sin\phi \cos\psi - \cos\phi \sin\psi)\cos\zeta \quad (10)$$

As to an angle φ, the following Equations (11) and (12) are satisfied.

[Equation 11]

$$\cos\phi = \frac{r-h}{r} \quad (11)$$

[Equation 12]

$$\sin\phi = \sqrt{1-\left(\frac{r-h}{r}\right)^2} = \frac{\sqrt{2rh-h^2}}{r} \quad (12)$$

The angle ψ is expressed by the following Equation (13). Here, "s" is a moving distance of a center of the second wheel 5-2 from the passing start point (contact point).

[Equation 13]

$$\psi = \frac{s}{r} \quad (13)$$

The following Equations (14) and (15) are obtained from Equations (10) to (13).

[Equation 14]

$$F = \frac{M \times A}{\cos\left(\phi - \frac{s}{r}\right)} + g \times \cos\zeta \times \left[M2 \times \tan\left(\phi - \frac{s}{r}\right) - M \times \tan\zeta\right] \quad (14)$$

[Equation 15]

$$\phi = \cos^{-1}\left(\frac{r-h}{r}\right) \quad (15)$$

As indicated in Equations (14) and (15), the driving force F depends on the acceleration A, the height h of the difference-in-level DL, and the second load W2 (i.e. the second mass M2). By using Equations (14) and (15), the vehicle travel control device 200 estimates the second driving force F2 required for the second wheel 5-2 to climb over the difference-in-level DL. The acceleration A is set to a desired value. For example, when the acceleration A is zero, no acceleration and deceleration occurs when the second wheel 5-2 passes the difference-in-level DL.

5-2-5. Step S50

As in the case of the first example, when the second wheel 5-2 passes the difference-in-level DL, the vehicle travel control device 200 generates the second driving force F2 indicated by the second driving force information 520

5-3. Third Example

Figure 15:
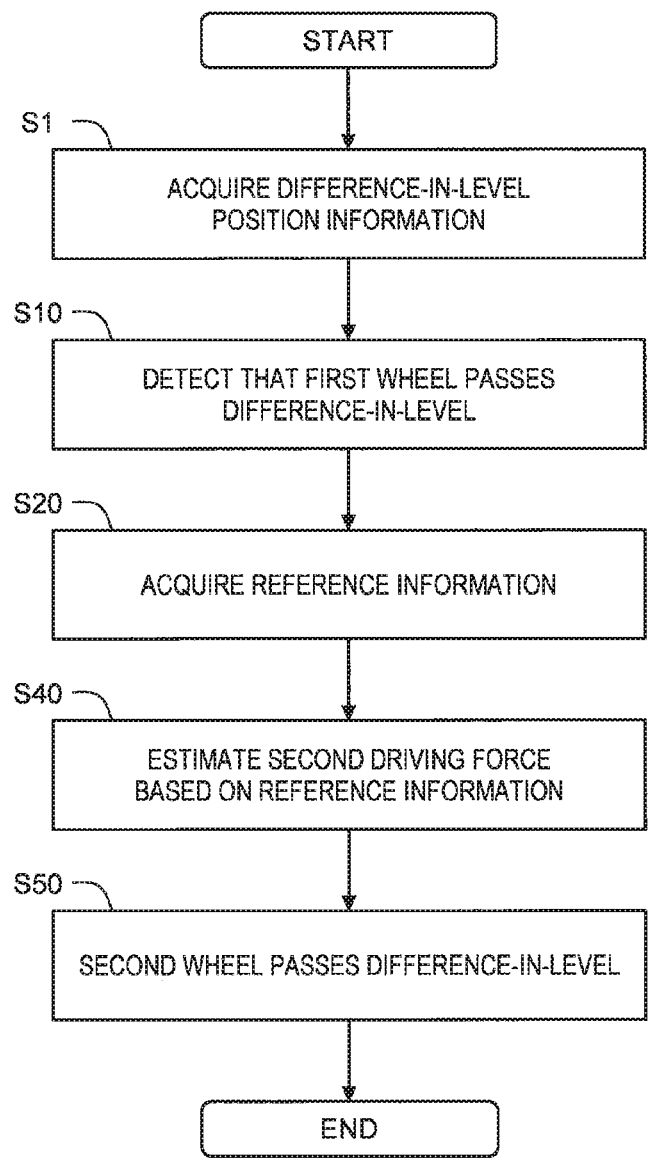
FIG. 15 is a flow chart showing a third example of the driving force control relating to the difference-in-level passing in the embodiment of the present disclosure.

FIG. 15 is a flow chart showing a third example of the driving force control relating to the difference-in-level passing. In Step S1, the vehicle travel control device 200 acquires the difference-in-level position information 400 based on the surrounding situation information 320 (see the second example 4-2 in Section 4). In the case of the third example, the above-described Step S30 is not necessary, and the passing position may be eliminated from the reference information 510. The other Steps S10, S20, S40, and S50 are the same as in the case of the first or second example described above.

5-4. Fourth Example

When the wheel 5 passes the difference-in-level DL, the vehicle travel control device 200 may correct the vehicle position PV given by the vehicle position information 350 in consideration of the height h of the difference-in-level DL. The height h of the difference-in-level DL is calculated from the above-described Equation (8). When the wheel 5 passes the difference-in-level DL, the vehicle travel control device 200 may regenerate the target path TP. These processing examples can be applied to any of the first to third examples described above.

6. Difference-In-Level Passing Cancel Processing

Next, let us consider a case where the vehicle travel control device 200 cancels (aborts) passing the difference-in-level DL. The vehicle travel control device 200 executes the vehicle travel control such that the vehicle 1 travels toward the target stop position PT. Depending on a relationship between the target stop position PT and the position of the difference-in-level DL on the travel path, the vehicle 1 may go beyond the target stop position PT when a certain wheel 5 passes the difference-in-level DL. In that case, the vehicle travel control device 200 executes "difference-in-level passing cancel processing" in advance so as to prevent the certain wheel 5 from passing the difference-in-level DL. The wheel 5 subject to determination of whether or not to prevent from passing the difference-in-level DL is hereinafter referred to as a "subject wheel".

6-1. First Example

Figure 16:
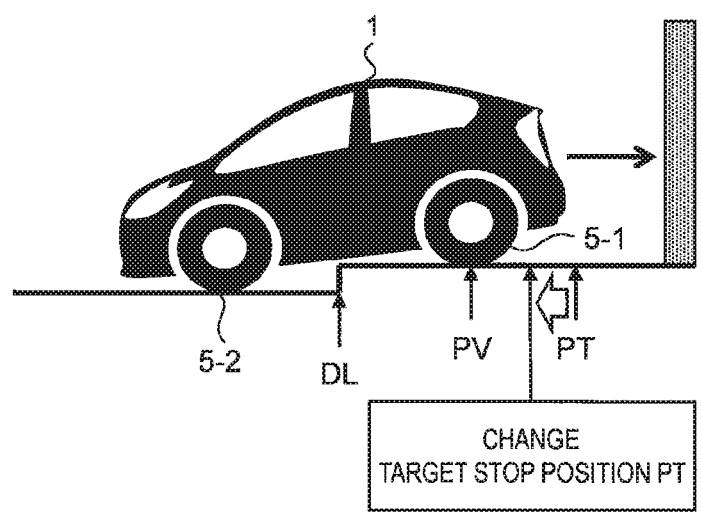
FIG. 16 is a conceptual diagram for explaining a first example of difference-in-level passing cancel processing according to the embodiment of the present disclosure.

FIG. 16 is a conceptual diagram for explaining a first example of the difference-in-level passing cancel processing. The first wheel 5-1 has already passed the differencein-level DL, while the second wheel 5-2 does not yet reach the difference-in-level DL. In the present example, the second wheel 5-2 is the subject wheel.

The vehicle travel control device 200 determines (predicts) whether or not the vehicle 1 (i.e. the vehicle position PV) goes beyond the target stop position PT when the second wheel 5-2 passes the difference-in-level DL. More specifically, after the first wheel 5-1 passes the difference-in-level DL, the above-described Step S30 is executed and thus the position of the difference-in-level DL is estimated and the difference-in-level position information 400 is acquired. The vehicle position PV and the position of the second wheel 5-2 are given by the vehicle position information 350. Based on the difference-in-level position information 400 and the vehicle position information 350, it is possible to determine (predict) whether or not the vehicle position PV goes beyond the target stop position PT when the second wheel 5-2 passes the difference-in-level DL.

For example, the vehicle travel control device 200 predicts the vehicle position PV at a timing when the second wheel 5-2 passes the difference-in-level DL, based on the difference-in-level position information 400 and the vehicle position information 350. The vehicle position PV predicted is hereinafter referred to as a "predicted vehicle position PVp". When the predicted vehicle position PVp goes beyond the target stop position PT, the vehicle travel control device 200 determines that the vehicle position PV goes beyond the target stop position PT when the second wheel 5-2 passes the difference-in-level DL. As another example, in the situation where the driving force is increased for the difference-in-level passing, it is not always possible to stop the vehicle 1 immediately after the second wheel 5-2 climbs over the difference-in-level DL. Therefore, when the predicted vehicle position PVp is within a predetermined range before the target stop position PT, the vehicle travel control device 200 determines that the vehicle position PV goes beyond the target stop position PT when the second wheel 5-2 passes the difference-in-level DL.

When determining that the vehicle position PV goes beyond the target stop position PT when the second wheel 5-2 passes the difference-in-level DL, the vehicle travel control device 200 changes the target stop position PT to the near side so as to prevent the second wheel 5-2 from passing the difference-in-level DL. After that, the vehicle travel control device 200 moves the vehicle 1 to the post-change target stop position PT. The vehicle 1 stops at the target stop position PT and is prevented from going beyond the target stop position PT. Accordingly, for example, the vehicle 1 is prevented from colliding with a wall or the like.

Figure 17:
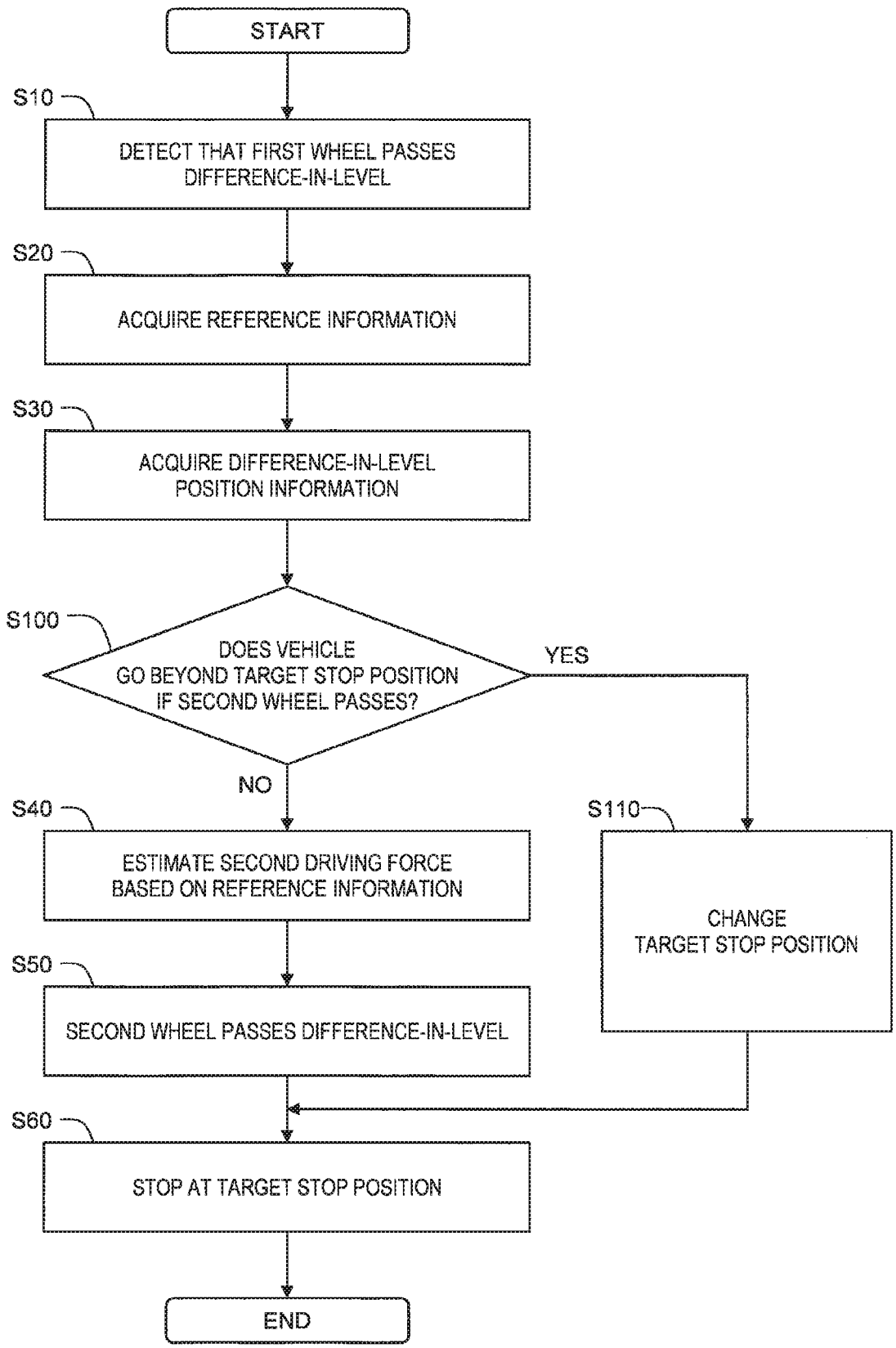
FIG. 17 is a flow chart showing a first example of the difference-in-level passing cancel processing according to the embodiment of the present disclosure.

FIG. 17 is a flow chart showing the first example of the difference-in-level passing cancel processing. Steps S10 to S30 are the same as those described in FIG. 13. The first wheel 5-1 passes the difference-in-level DL, and the vehicle travel control device 200 acquires the reference information 510 and the difference-in-level position information 400.

In Step S100, the vehicle travel control device 200 estimates the second wheel 5-2 based on the travel state information 300 and the difference-in-level position information 400. Then, based on the difference-in-level position information 400 and the vehicle position information 350, the vehicle travel control device 200 determines whether or not the vehicle 1 (i.e. the vehicle position PV) goes beyond the target stop position PT when the second wheel 5-2 (i.e. the subject wheel) passes the difference-in-level DL.

If it is determined that the vehicle 1 does not go beyond the target stop position PT (Step S100; No), then the processing proceeds to Step S40. Steps S40 and S50 are the same as those described in FIG. 13. After Step S50, the processing proceeds to Step S60. In Step S60, the vehicle travel control device 200 executes the vehicle travel control to move the vehicle 1 to the target stop position PT and stop the vehicle 1 at the target stop position PT. Then, the vehicle assist control ends.

On the other hand, if it is determined that the vehicle 1 goes beyond the target stop position PT (Step S100; Yes), then the processing proceeds to Step S110. In Step S110, the vehicle travel control device 200 changes the target stop position PT to the near side so as to prevent the second wheel 5-2 from passing the difference-in-level DL. After that, the processing skips Steps S40 and S50 and proceeds to Step S60. In Step S60, the vehicle travel control device 200 moves the vehicle 1 to the post-change target stop position PT. The vehicle 1 stops at the target stop position PT and is prevented from going beyond the target stop position PT. Accordingly, for example, the vehicle 1 is prevented from colliding with a wall or the like.

6-2. Second Example

Figure 18:
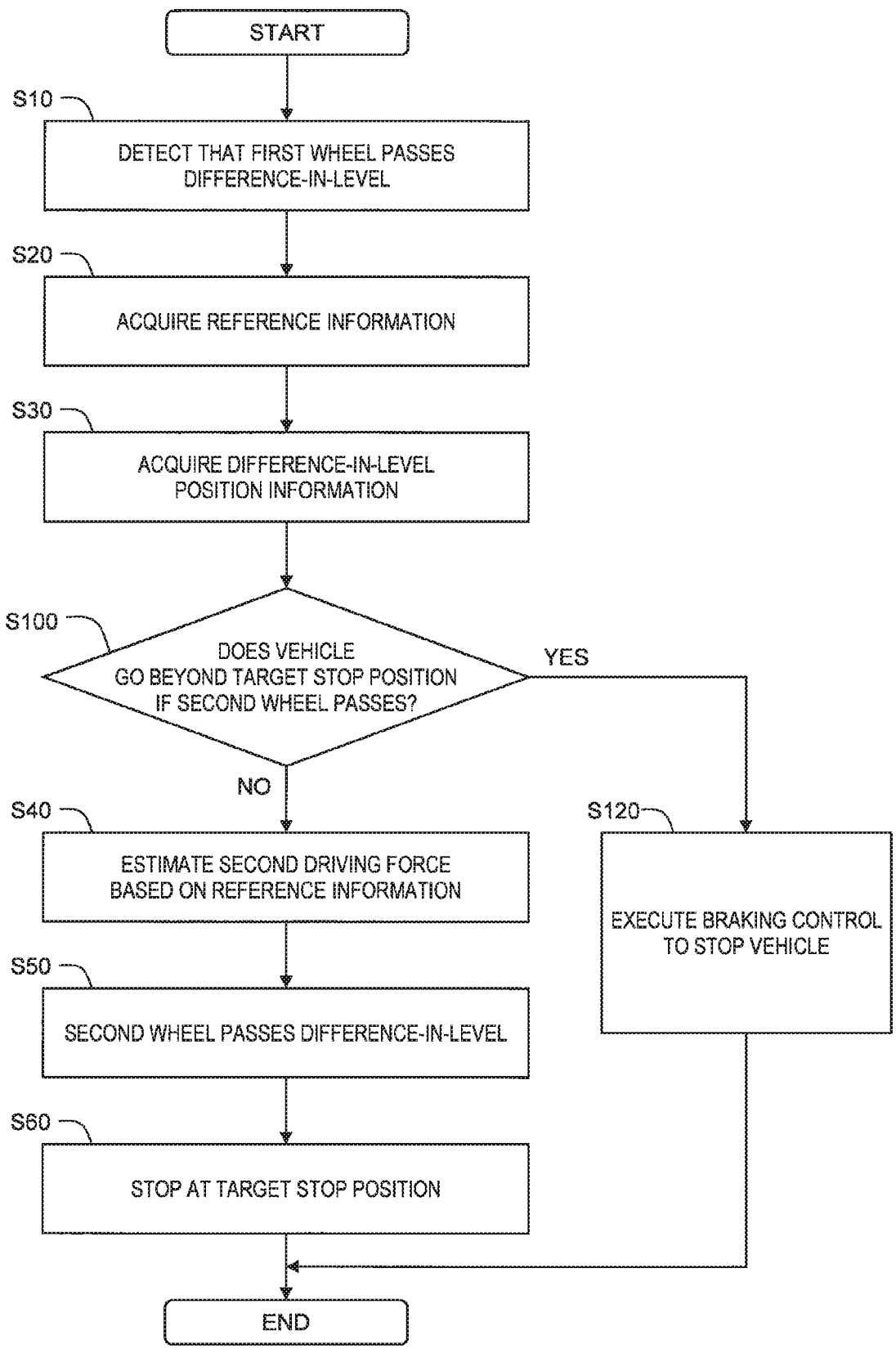
FIG. 18 is a flow chart showing a second example of the difference-in-level passing cancel processing according to the embodiment of the present disclosure.

FIG. 18 is a flow chart showing a second example of the difference-in-level passing cancel processing. An overlapping description with the first example shown in FIG. 17 will be omitted as appropriate. If it is determined in Step S100 that the vehicle 1 goes beyond the target stop position PT (Step S100; Yes), then the processing proceeds to Step S120.

In Step S120, the vehicle travel control device 200 generates the braking force to stop the vehicle 1 before the second wheel 5-2 passes the difference-in-level DL. In other words, the vehicle travel control device 200 forces the vehicle 1 to stop by executing the braking control. The target stop position PT may be maintained or canceled. In either case, Steps S40 to S60 are not performed. The vehicle 1 stops before reaching the target stop position PT. Then, the vehicle assist control ends. Such the processing can also achieve the same effects as in the case of the first example.

6-3. Third Example

Even before the first wheel 5-1 does not pass the difference-in-level DL, the position of the difference-in-level DL may be estimated (see FIG. 15 and the third example 5-3 in Section 5). In this case, it is also possible to determine whether or not the vehicle 1 goes beyond the target stop position PT when the first wheel 5-1 passes the difference-in-level DL. That is to say, the first wheel 5-1 can also be the subject wheel.

Figure 19:
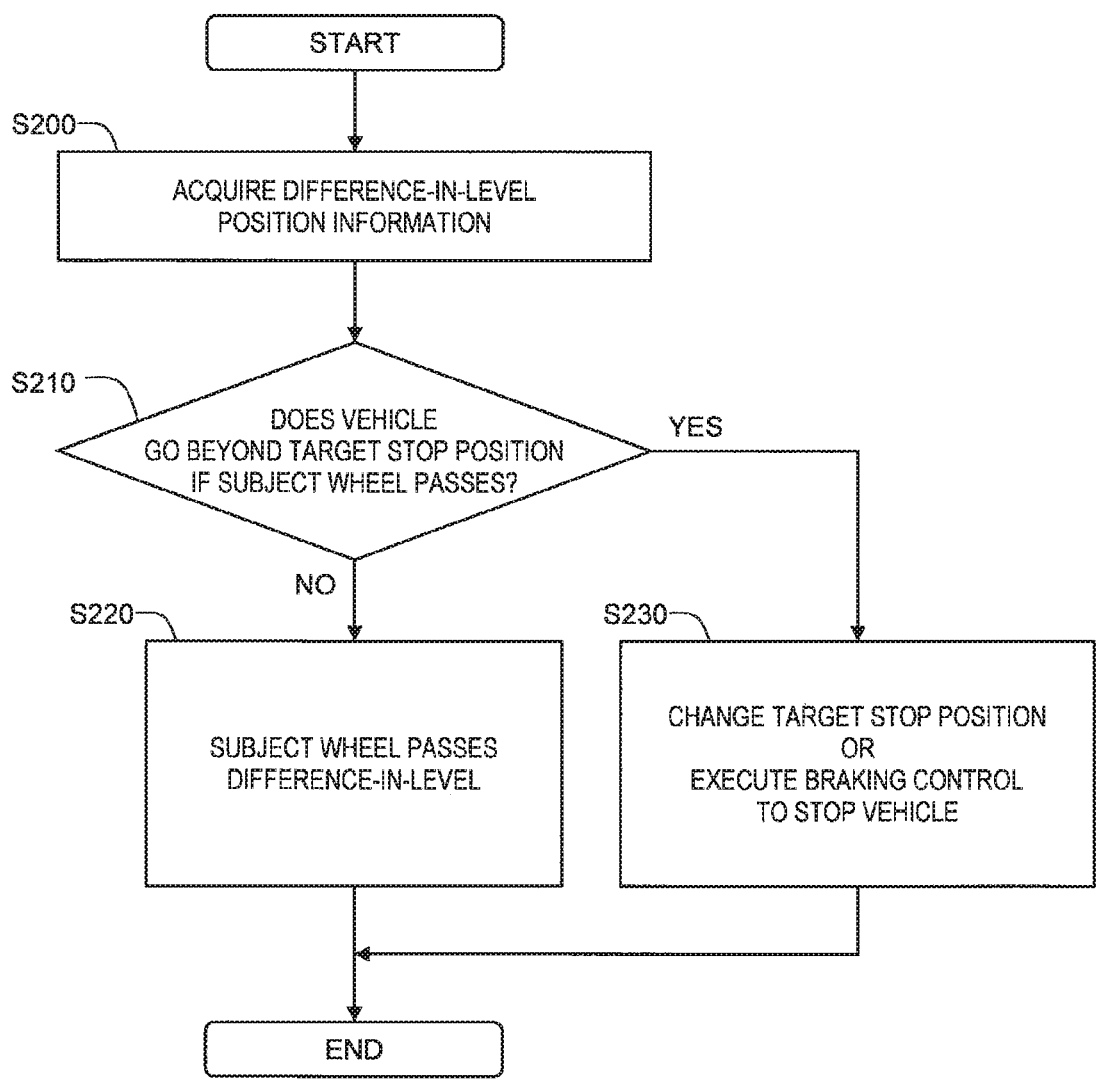
FIG. 19 is a flow chart showing a third example of the difference-in-level passing cancel processing according to the embodiment of the present disclosure.

FIG. 19 is a flow chart showing the difference-in-level passing cancel processing in a summarized manner. In Step S200, the difference-in-level position estimation device acquires the difference-in-level position information 400. In Step S210, the vehicle travel control device 200 determines (predicts) whether or not the vehicle 1 goes beyond the target stop position PT when the subject wheel passes the difference-in-level DL, based on the difference-in-level position information 400 and the vehicle position information 350.

If it is determined that the vehicle 1 does not go beyond the target stop position PT (Step S210; No), then the processing proceeds to Step S220. In Step S220, the subject wheel passes the difference-in-level DL.

On the other hand, if it is determined that the vehicle 1 goes beyond the target stop position PT (Step S210; Yes), the processing proceeds to Step S230. In Step S230, the vehicle travel control device 200 changes the target stop position PT to the near side so as to prevent the subject wheel from passing the difference-in-level DL. Alternatively, the vehicle travel control device 200 generates the braking force to stop the vehicle 1 before the subject wheel passes the difference-in-level DL.

7. Going Down Difference-In-Level

Figure 20:
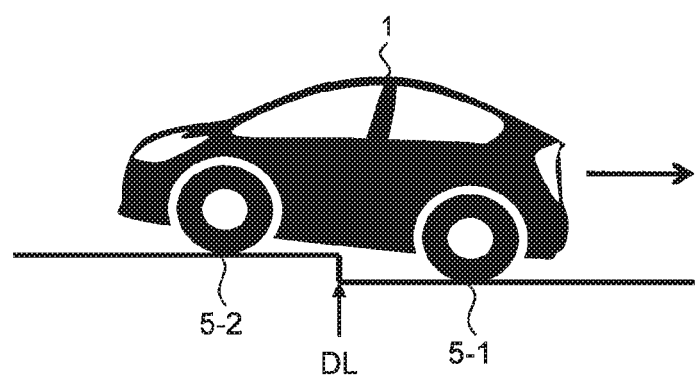
FIG. 20 is a conceptual diagram for explaining difference-in-level going-down processing by the vehicle travel assist device according to the embodiment of the present disclosure.

FIG. 20 shows a situation where the wheel 5 goes down the difference-in-level DL. Climbing up and going down are distinguishable based on the change in the vehicle speed or the change in the camera's field of vision. Based on the travel state information 300, the vehicle travel control device 200 detects that any wheel 5 goes down the difference-in-level DL and identifies the wheel 5 that passes the difference-in-level DL. The identified wheel 5 is the first wheel 5-1. Then, the vehicle travel control device 200 estimates the position of the difference-in-level DL and estimates the second wheel 5-2 by the same method as in the case of climbing up.

In order to suppress shock when the second wheel 5-2 passes the difference-in-level DL, the vehicle travel control device 200 may substantially slow down the vehicle 1 before the second wheel 5-2 reaches the difference-in-level DL. The vehicle travel control device 200 may preliminarily increase a brake pressure before the second wheel 5-2 reaches the difference-in-level DL so as to be able to generate the braking force immediately after the going down. The vehicle travel control device 200 may execute the braking force control during a period when the second wheel 5-2 goes down the difference-in-level DL.

What is claimed is:

1. A vehicle travel assist device installed on a vehicle and comprising a processor programmed to:
   control travel of the vehicle toward a target stop position;
   acquire travel state information indicating a travel state of the vehicle; and
   acquire difference-in-level position information indicating a position of a difference-in-level on a travel path of the vehicle, wherein
   the travel state information includes vehicle position information indicating a position of the vehicle and a position of each wheel, and
   the processor is further programmed to:
   when the position of the difference-in-level is on the travel path in a location between a subject wheel and the target stop position, whether or not the vehicle goes beyond the target stop position when the subject wheel of the vehicle passes the difference-in-level, based on the difference-in-level position information and the vehicle position information; and
   when it is predicted that the vehicle goes beyond the target stop position when the subject wheel passes the difference-in-level, change the target stop position so as to prevent the subject wheel from passing the difference-in-level.

2. The vehicle travel assist device according to claim 1, wherein
   the vehicle comprises a first wheel and a second wheel that reaches the difference-in-level after the first wheel, and
   the subject wheel is the second wheel.

3. The vehicle travel assist device according to claim 2, wherein
   the first wheel includes two wheels, and
   the processor is further programmed to:
   acquire respective positions of the two wheels when passing the difference-in-level as a first passing position and a second passing position, based on the vehicle position information; and
   assume a position of a line connecting the first passing position and the second passing position as the position of the difference-in-level.

4. The vehicle travel assist device according to claim 1, wherein
   the processor is further programmed to:
   predict the position of the vehicle at a timing when the subject wheel passes the difference-in-level, as a predicted vehicle position, based on the difference-in-level position information and the vehicle position information; and
   when the predicted vehicle position goes beyond the target stop position or the predicted vehicle position is within a predetermined range before the target stop position, predict that the vehicle goes beyond the target stop position when the subject wheel passes the difference-in-level.

* * * * *